__US011190969B2__

(12) United States Patent
Ke et al.

(10) Patent No.: US 11,190,969 B2
(45) Date of Patent: Nov. 30, 2021

(54) METHOD AND DEVICE FOR OPERATING AND CONTROLLING DATA FLOW

(71) Applicant: Samsung Electronics Co., Ltd., Suwon-si (KR)

(72) Inventors: Xiaowan Ke, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 16/628,868

(22) PCT Filed: Aug. 10, 2018

(86) PCT No.: PCT/KR2018/009150
§ 371 (c)(1),
(2) Date: Jan. 6, 2020

(87) PCT Pub. No.: WO2019/031901
PCT Pub. Date: Feb. 14, 2019

(65) Prior Publication Data
US 2020/0229023 A1 Jul. 16, 2020

(30) Foreign Application Priority Data
Aug. 10, 2017 (CN) .......................... 201710682280.2

(51) Int. Cl.
*H04W 28/02* (2009.01)
*H04W 76/10* (2018.01)

(52) U.S. Cl.
CPC ....... *H04W 28/0268* (2013.01); *H04W 76/10* (2018.02)

(58) Field of Classification Search
None
See application file for complete search history.

(56) References Cited

U.S. PATENT DOCUMENTS

2019/0037631 A1* 1/2019 Byun .................... H04W 76/20

FOREIGN PATENT DOCUMENTS

EP          2 981 129 A1    2/2016

OTHER PUBLICATIONS

LG Electronics, Inc. Functions of the F1 Interface May 2017 p. 1-4 (Year: 2017).*
Samsung, SCG Split Bearer Support in Option 3, 3GPP TSG RAN WG3 NR AdHoc, R3-172235, Qingdao, China, Jun. 20, 2017.
Samsung, Text Proposal for QoS Support in NR Dual Connectivity, 3GPP TSG RAN WG3 Meeting #96, R3-171644, Hangzhou, P.R. China, May 6, 2017.

(Continued)

*Primary Examiner* — Ayanah S George
(74) *Attorney, Agent, or Firm* — Jefferson IP Law, LLP

(57) ABSTRACT

The disclosure provides a method and an apparatus for operating and controlling a data flow. The method includes steps of: acquiring, by a first node, information on a Quality-of-Service (QoS) flow and/or resource information on a node; and deciding, by the first node, whether to accept the QoS flow and/or performance result information for the QoS flow, according to the acquired resource information on the node and/or the acquired information on the QoS flow.

19 Claims, 6 Drawing Sheets

(56) References Cited

OTHER PUBLICATIONS

ZTE, Further Discussion on SCG Split Bearer Configuration, 3GPP TSG RAN WG3 Ad-Hoc, R3-172054 (Revision of R3-171557), Qingdao, China, Jun. 19, 2017.
Samsung et al., Stage 2 text proposal for TS38.401 on RRM function split between gNB-CU and gNB-DU, 3GPP TSG RAN WG3 Meeting Ad Hoc, R3-172258, Qingdao, P. R. China, Jun. 20, 2017.
Extended European Search Report dated Jun. 4, 2020, issued in a counterpart European Application No. 18844303.0-1215 / 3656150.
LG Electronics Inc.; Functions of the F1 interface; 3GPP TSG-RAN WG3 Meeting #96; R3-171548; May 15, 2017, Hangzhou, China.
Ericsson, Vodafone; SgNB addition in disaggregated gNB with E1 interface; 3GPP TSG-RAN WG3 AH #2 Tdoc R3-172539; Jun. 27, 2017, Qingdao, P. R. China.

* cited by examiner

[Fig. 1A]
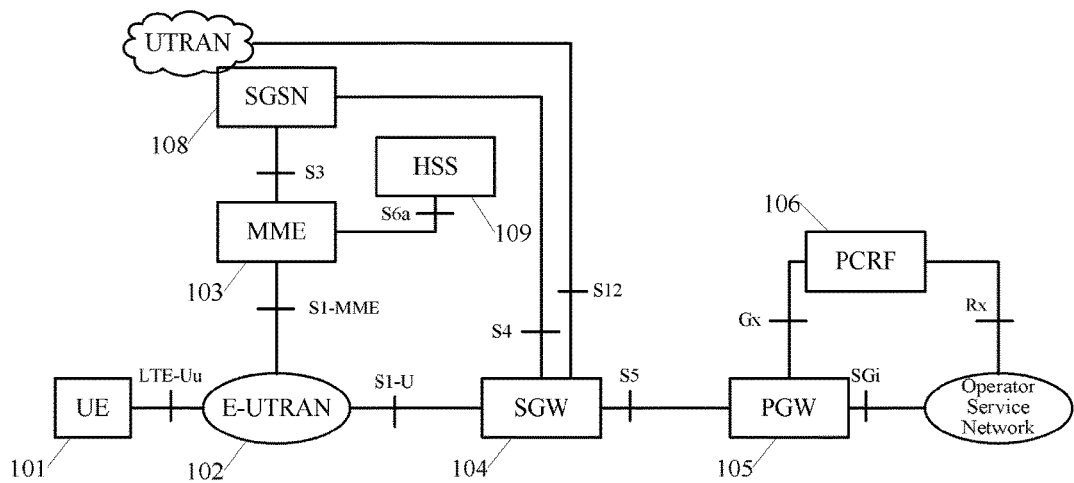
[Fig. 1B]
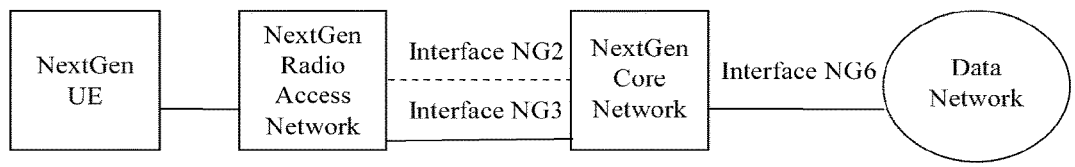
[Fig. 2A]
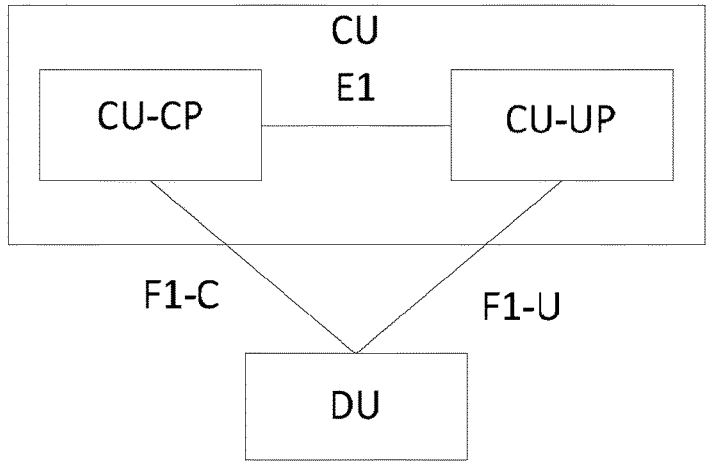
[Fig. 2B]
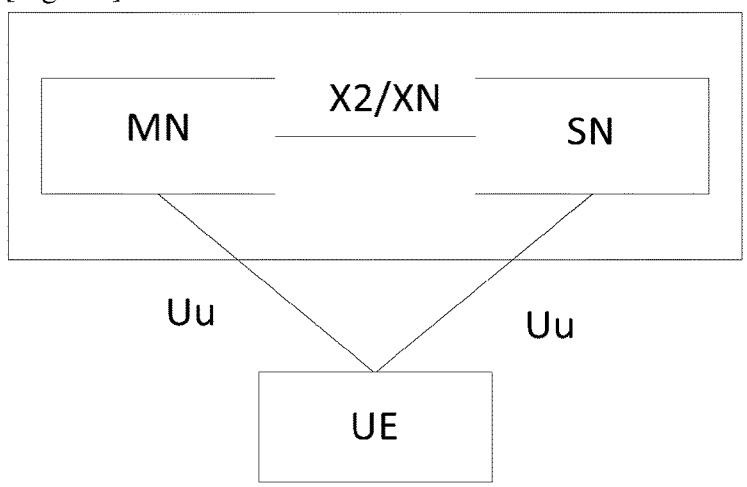

[Fig. 3]
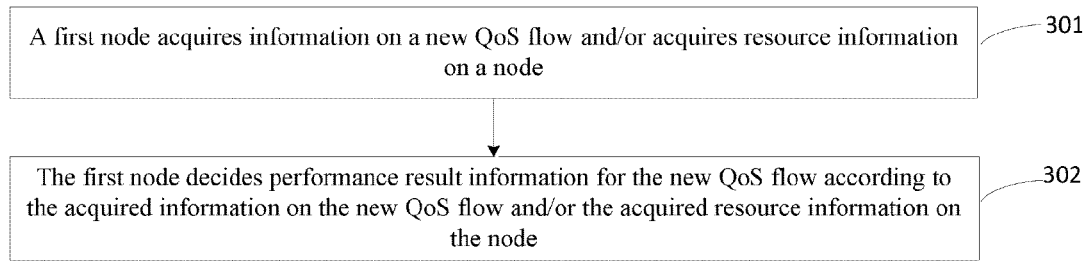
[Fig. 4A]
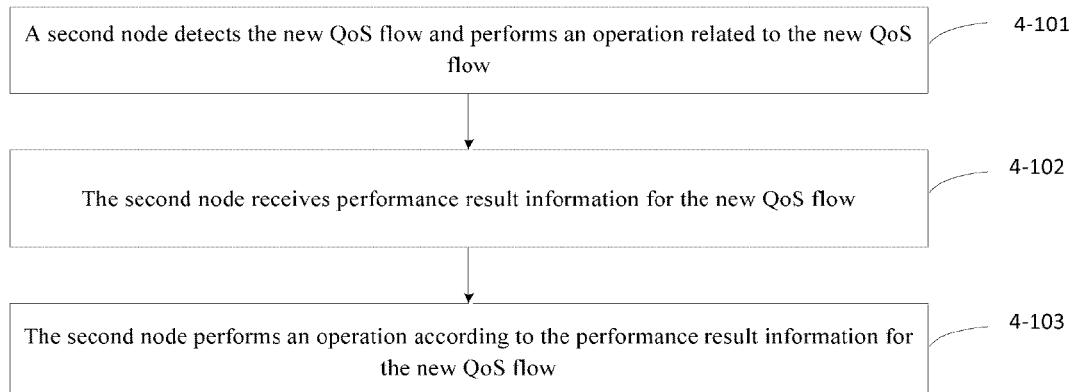
[Fig. 4B]
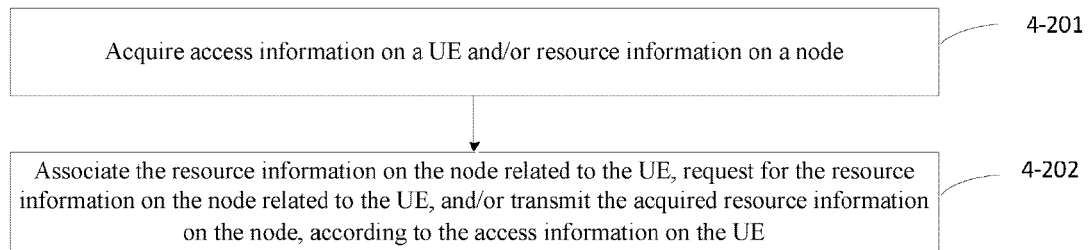
[Fig. 5]
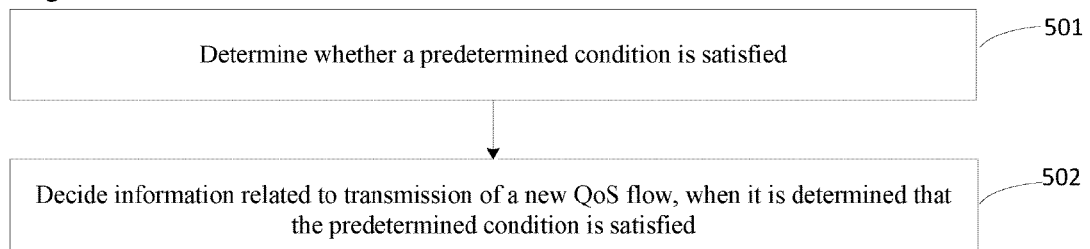
[Fig. 6]
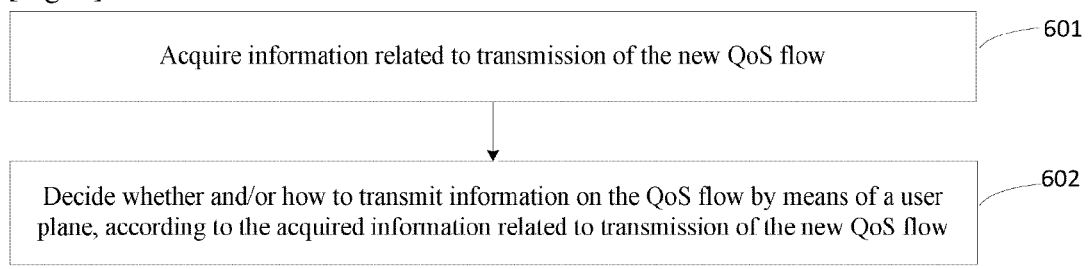

[Fig. 7]
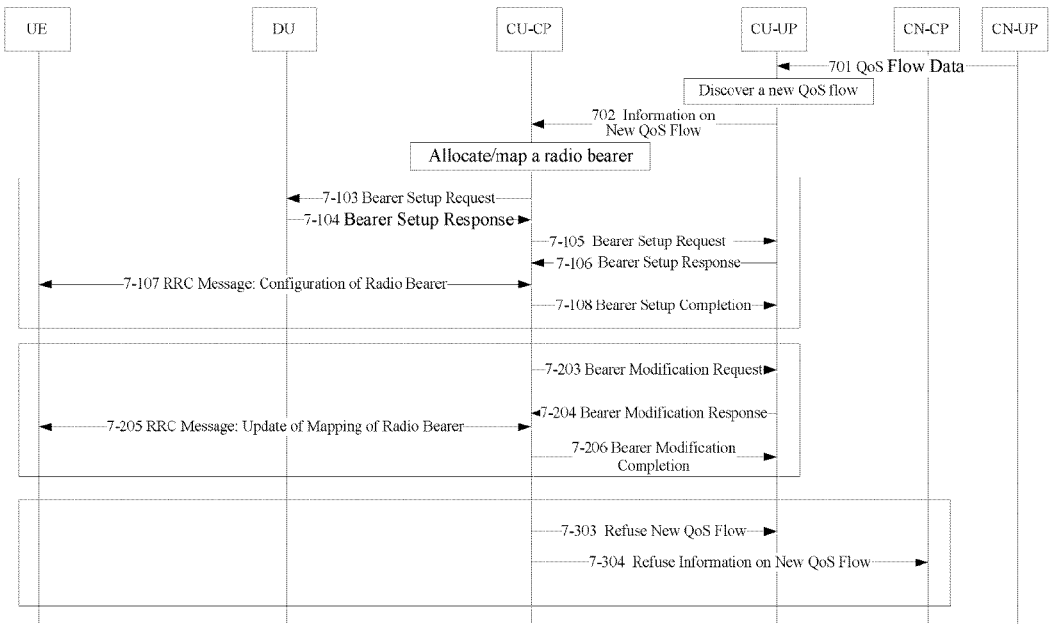
[Fig. 8]
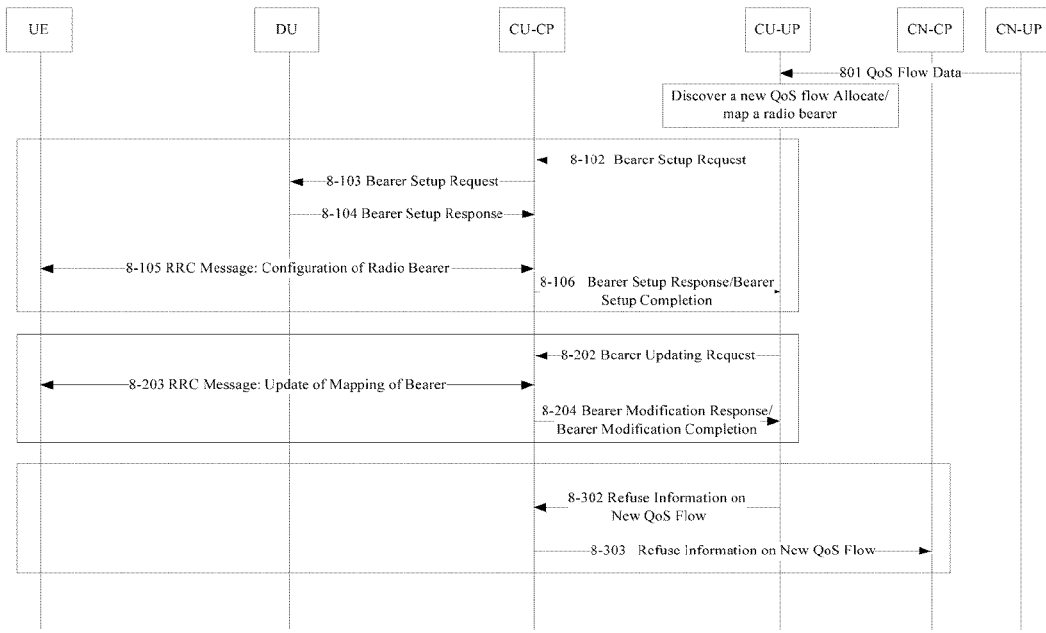

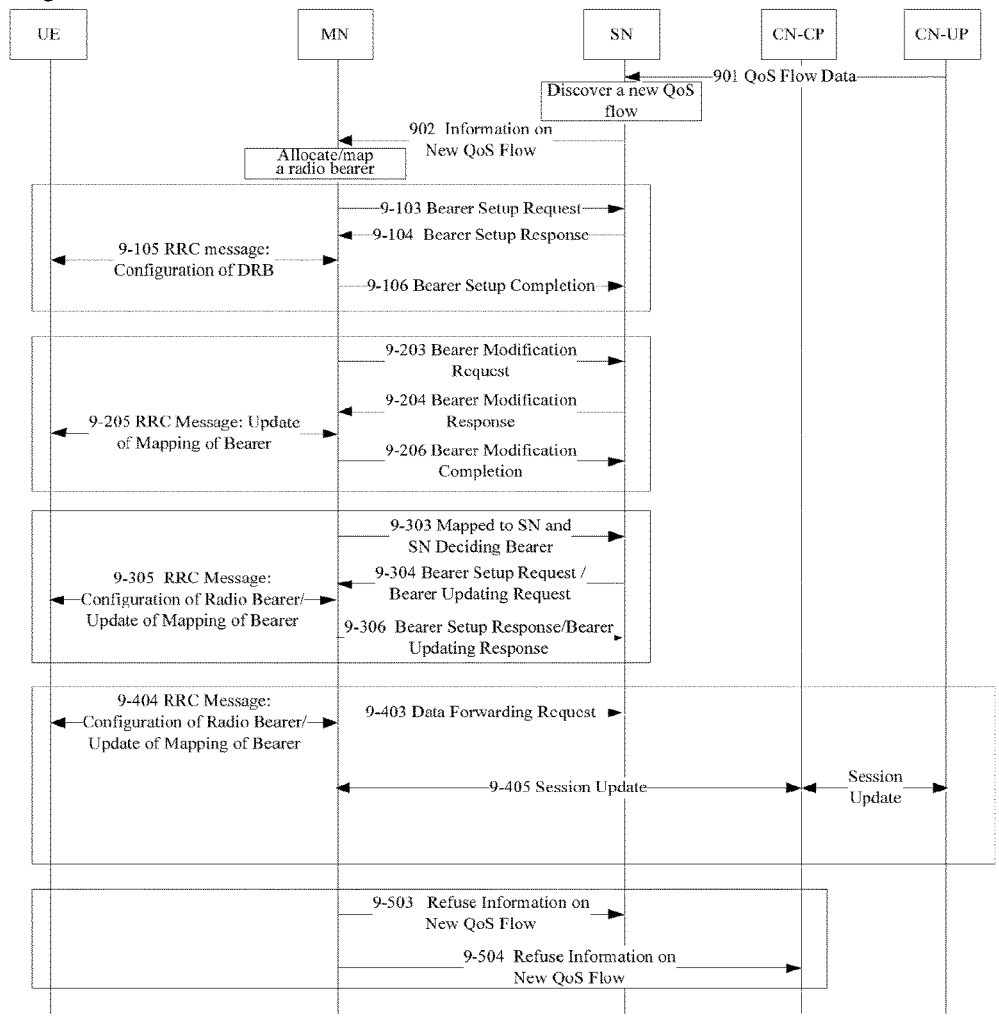
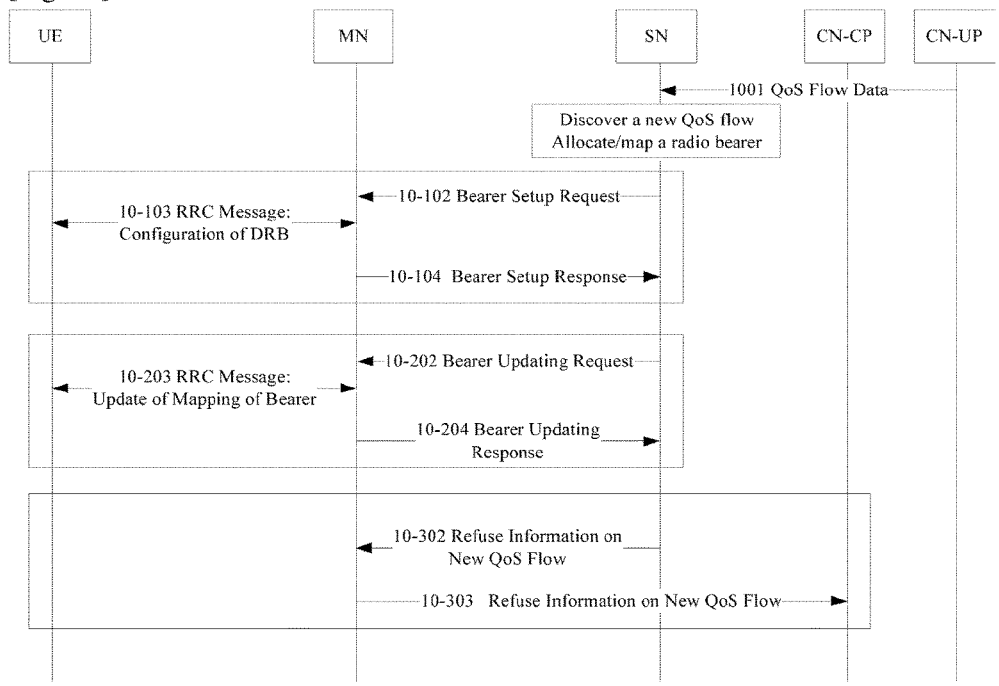

[Fig. 11]
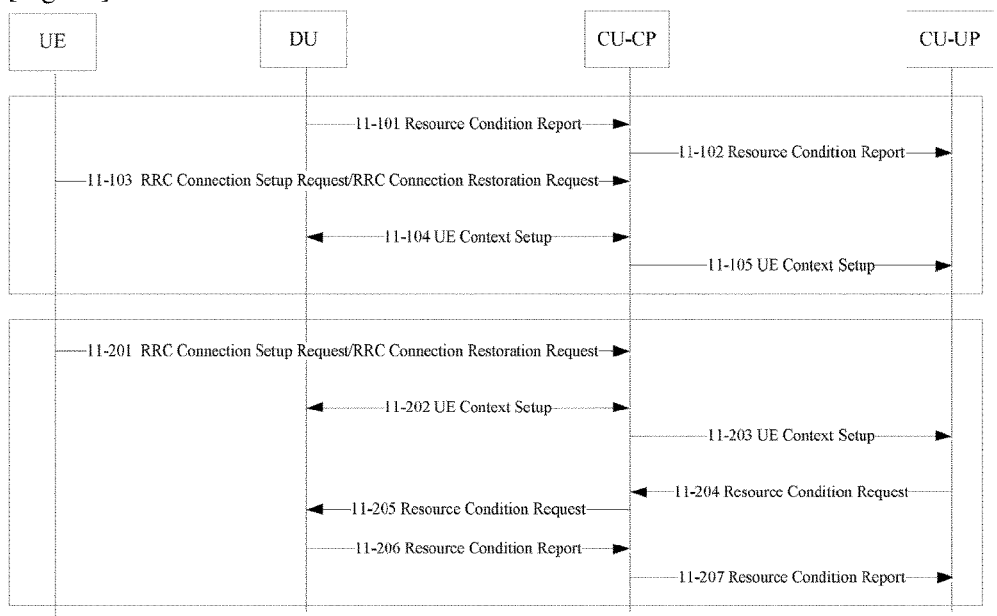
[Fig. 12]
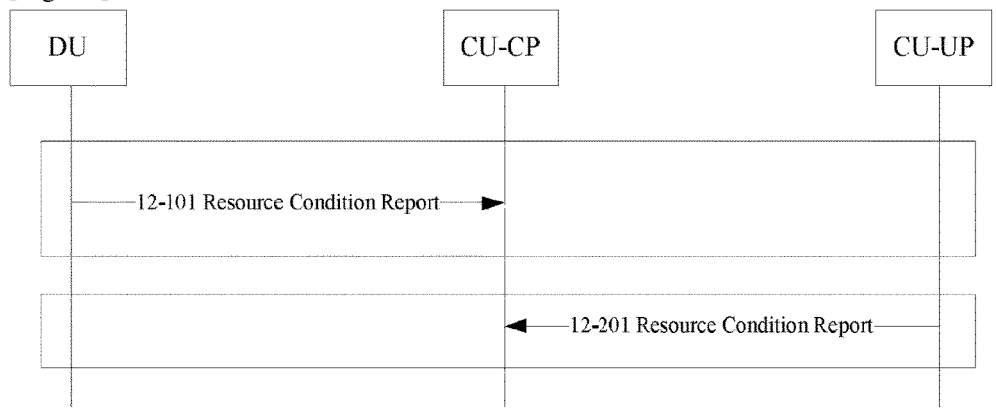
[Fig. 13]
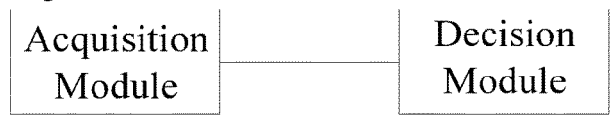
[Fig. 14]
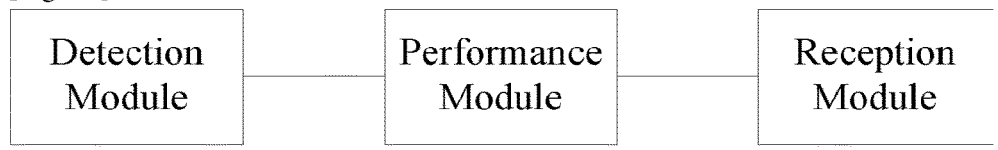
[Fig. 15]
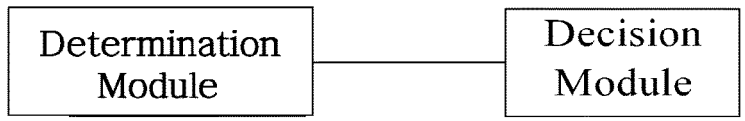
[Fig. 16]
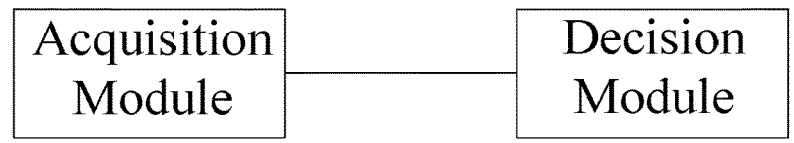

[Fig. 17]
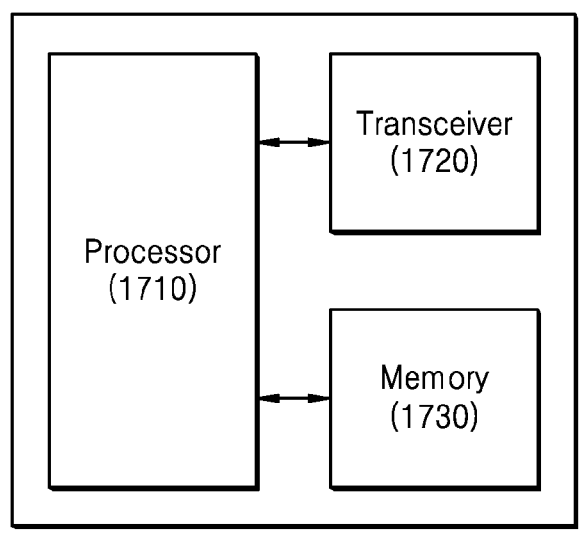

METHOD AND DEVICE FOR OPERATING AND CONTROLLING DATA FLOW

TECHNICAL FIELD

The present disclosure relates to a wireless communication technology, and in particular, to a method and device for operating and controlling a data flow.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

The disclosure provides a method and an apparatus for operating and controlling a data flow. The method includes steps of: acquiring, by a first node, information on a Quality-of-Service (QoS) flow and/or resource information on a node; and deciding, by the first node, whether to accept the QoS flow and/or performance result information for the QoS flow, according to the acquired resource information on the node and/or the acquired information on the QoS flow.

Advantageous Effects of Invention

By addressing the problem of radio resource allocation for a new QoS flow obtained through the user plane in the architecture having dual-connectivity and a Control Plane/User Plane (CP/UP) split, on one hand, advantages of the dual-connectivity and the CP/UP split may be achieved, and on the other hand, mapping QoS flows to radio bearers under the 5G network architecture may be supported, which may increase a throughput, reduce a latency, and reduce a signaling overhead.

BRIEF DESCRIPTION OF DRAWINGS

FIG. 1A is a schematic diagram of a system architecture of System Architecture Evolution (SAE) of the present disclosure;

FIG. 1B is a schematic diagram of an initial system architecture of a next-generation network (5G) of the present disclosure;

FIG. 2A is a schematic diagram of an architecture of a Centralized Unit/Distributed Unit (CU/DU) split in conjunction with a Control Plane/User Plane (CP/UP) split of the present disclosure;

FIG. 2B is a schematic diagram of a system architecture of dual-connectivity of the present disclosure;

FIG. 3 is a flow chart of a first method of operating and controlling a data flow of the present disclosure;

FIG. 4A is a flow chart of a second method of operating and controlling a data flow of the present disclosure;

FIG. 4B is a flow chart of a third method of operating and controlling a data flow of the present disclosure;

FIG. 5 is a flow chart of a fourth method of operating and controlling a data flow of the present disclosure;

FIG. 6 is a flow chart of a fifth method of operating and controlling a data flow of the present disclosure;

FIG. 7 is a schematic diagram of a first embodiment of a method of operating and controlling a data flow of the present disclosure;

FIG. 8 is a schematic diagram of a second embodiment of a method of operating and controlling a data flow of the present disclosure;

FIG. 9 is a schematic diagram of a third embodiment of a method of operating and controlling a data flow of the present disclosure;

FIG. 10 is a schematic diagram of a fourth embodiment of a method of operating and controlling a data flow of the present disclosure;

FIG. 11 is a schematic diagram of a fifth embodiment of a method of operating and controlling a data flow of the present disclosure;

FIG. 12 is a schematic diagram of a sixth embodiment of a method of operating and controlling a data flow of the present disclosure;

FIG. 13 is a structure diagram of a preferred device of the present disclosure;

FIG. 14 is a structure diagram of a preferred device of the present disclosure;

FIG. 15 is a structure diagram of a preferred device of the present disclosure;

FIG. 16 is a structure diagram of a preferred device of the present disclosure; and FIG. 17 is a structure diagram of a preferred device of the present disclosure.

BEST MODE FOR CARRYING OUT THE INVENTION

According to an aspect of the disclosure, a method for operating and controlling a data flow is provided, including: acquiring, by a first node, information on a Quality-of-Service (QoS) flow and/or resource information on a node; and deciding, by the first node, performance result information for the QoS flow according to the acquired the resource information on the node and/or the information on the QoS flow.

Preferably, the acquiring, by the first node, the resource information on the node further includes acquiring access information on a UE, and performing at least one of: associating the resource information on the node related to the UE or requesting for the resource information on the node related to the UE, according to the access information on the UE.

Preferably, the information on the QoS flow includes at least one of an identity of the QoS flow, a QoS profile of the QoS flow, a QoS rule context of the QoS flow, and a request for allocating a resource for the QoS flow; and/or the resource information on the node includes at least one of resource information on a Distributed Unit (DU), resource information on a Centralized Unit-Control Plane (CU-CP), resource information received by a Centralized Unit-User Plane (CU-UP), resource information on a Master radio access network Node (MN), resource information on a Secondary radio access network Node (SN), resource information on a Control Plane node (CP), and resource information on a User Plane node (UP); and/or the performance result information for the QoS flow includes at least one of: information on whether to accept the QoS flow, information on a radio bearer to which the QoS flow is mapped, a configuration of the radio bearer to which the QoS flow is mapped, an indication that a receiving node of downlink data of the QoS flow is changed, an indication of reasons for refusing to accept the QoS flow, an indication that the QoS flow is released, an indication that buffered data of the QoS flow is discarded, an indication that a radio bearer resource pre-reserved for the QoS flow is released, an indication that a radio bearer configuration pre-allocated to the QoS flow is released, an indication that the radio bearer to which the QoS flow is mapped is released, an indication of a transmission layer address at a radio access network side for the QoS flow at an interface between a radio access network and a core network, an indication that a transmission address of the downlink data of the QoS flow is updated, an indication that the buffered data of the QoS flow is forwarded, a data forwarding address of the QoS flow, and information on confirmation of being capable of allocating and/or mapping the radio bearer for the QoS flow.

Preferably, the acquiring, by the first node, the information on the QoS flow includes receiving, by the first node, the information on the QoS flow from a second node; the information on the QoS flow further includes at least one of an indication that the second node can accept the QoS flow, an indication that the second node has reserved a resource required for a radio bearer for the QoS flow, information on a radio bearer pre-allocated and/or pre-mapped for the QoS flow by the second node, a refusal to accept the QoS flow of the second node, and reasons why the second node refuses to accept the QoS flow; and/or the acquiring, by the first node, the resource information on the node includes at least one of: receiving, by the first node, resource information of the DU from the CU-CP; receiving, by the first node, resource information of the CU-CP from the CU-CP; receiving, by the first node, resource information of the DU from the DU; receiving, by the first node, resource information of the MN from the MN; and receiving, by the first node, resource information of the SN from the SN.

Preferably, the deciding, by the first node, whether to accept the QoS flow according to the acquired resource information on the node and/or the acquired information on the QoS flow specifically includes one of:

accepting the QoS flow, when both a resource of the DU and a resource of the CU-UP can meet a requirement of the QoS flow;

refusing to accept the QoS flow, when a resource of the DU or a resource of the CU-UP cannot meet a requirement of the QoS flow;

accepting the QoS flow, when a resource of the MN or a resource of the SN can meet a requirement of the QoS flow; and refusing the QoS flow, when both a resource of the MN and a resource of the SN cannot collectively meet a requirement of the QoS flow.

Preferably, when the first node decides to accept the QoS flow, the first node performs at least one of operations including but not limiting to: allocating and/or mapping a radio bearer resource for the QoS flow, specifying a bearer type of a radio bearer to which the QoS flow is mapped, specifying, for the QoS flow, a transmission layer address at a radio access network side at an interface between a radio access network and a core network, allocating a data forwarding address to the QoS flow, and specifying a serving cell for the QoS flow, and/or when the first node decides to accept the QoS flow, the performance result information for the QoS flow decided by the first node includes at least one of: an indication that the QoS flow is accepted, information on a radio bearer to which the QoS flow is mapped, a configuration of the radio bearer to which the QoS flow is mapped, an indication of a transmission layer address at a radio access network side for the QoS flow at an interface between a radio access network and a core network, an indication that a transmission address of downlink data of the QoS flow is updated, an indication that buffered data of the QoS flow is forwarded, a data forwarding address of the QoS flow, and a confirmation of being capable of allocating and/or mapping the radio bearer for the QoS flow; and/or when the first node decides to refuse to accept the QoS flow, the first node performs at least one of operations including but not limiting to: discarding the buffered data of the QoS flow, and informing a core network that the QoS flow is refused to be accepted by a radio access network and/or reasons for the refusal, and/or when the first node decides to refuse to accept the QoS flow, the performance result information for the QoS flow decided by the first node includes at least one of: an indication that the QoS flow is refused to be accepted, an indication of reasons why the QoS flow is refused to be accepted, an indication that the QoS flow is released, an indication that buffered data of the QoS flow is discarded, an indication that a radio bearer resource pre-reserved for the QoS flow is released, an indication that a radio bearer configuration pre-allocated to the QoS flow is released, an indication that the radio bearer to which the QoS flow is mapped is released.

Preferably, the first node receives the information on the QoS flow from a second node, and the method further includes transmitting, by the first node, the decided performance result information for the QoS flow to the second node; and/or receiving, by the first node, the resource information of the DU from the CU-CP further includes: requesting, by the first node, the CU-CP for the resource information of the DU; or, after the first node inquires the CU-CP about whether the QoS flow can be accepted for the resource information of the DU, receiving, by the first node, the resource information of the DU from the CU-CP; and/or before the first node receives the resource information on the node, the method further includes requesting, by the first node, a node which transmits the resource information on the node for the resource information on the node, or inquiring, by the first node, a node which transmits the resource information on the node about whether the QoS flow can be accepted by the resource information on the node.

Preferably, the first node and/or the second node is at least one of a CU-UP, a CU-CP, an MN, an SN, a CP, an UP, a core network node, a radio access network node, and a UE; and/or the first node receives the information on the QoS flow and/or the resource information on the node from at least one of a CU-UP, a CU-CP, an MN, an SN, a Control Plane (CP), a User Plane (UP), a core network node, a radio access network node, and a UE; and/or the QoS flow is at least one of a QoS flow which is not in a UE session context saved by the first node, a QoS flow newly added for a UE session, and a QoS flow for which no radio bearer resource is allocated and/or mapped; and/or the method further includes transmitting, by the first node, the acquired information on the QoS flow, the acquired resource information on the node and/or the decided performance result information for the QoS flow to at least one node of a CU-UP, a CU-CP, an MN, an SN, a CP, an UP, a core network node, a radio access network node and a UE.

According to another aspect of the disclosure, a method for operating and controlling a data flow is provided, including: detecting a Quality-of-Service (QoS) flow to perform an operation related to the QoS flow; receiving performance result information for the QoS flow; and performing a corresponding operation according to the performance result information for the QoS flow.

Preferably, the step of detecting the QoS flow to perform the operation related to the QoS flow includes at least one of: buffering data of the QoS flow, determining whether the QoS flow can be accepted, pre-reserving a resource required by a radio bearer for the QoS flow, pre-configuring/pre-mapping information on a radio bearer for the QoS flow, and transmitting the information on the QoS flow; and/or the performance result information for the QoS flow includes at least one of: whether to accept the QoS flow, information on a radio bearer to which the QoS flow is mapped, a configuration of the radio bearer to which the QoS flow is mapped, an indication of reasons for refusing to accept the QoS flow, an indication that a receiving node of downlink data of the QoS flow is changed, an indication that the QoS flow is released, an indication that buffered data of the QoS flow is discarded, an indication that a radio bearer resource pre-reserved for the QoS flow is released, an indication that a radio bearer configuration pre-allocated to the QoS flow is released, an indication that the radio bearer to which the QoS flow is mapped is released, an indication of a transmission layer address at a radio access network side for the QoS flow at an interface between a radio access network and a core network, an indication that a transmission address of the downlink data of the QoS flow is updated, an indication that the buffered data of the QoS flow is forwarded, a data forwarding address of the QoS flow, and a confirmation of being capable of allocating and/or mapping the radio bearer for the QoS flow.

Preferably, the step of performing a corresponding operation according to the performance result information for the QoS flow includes at least one of:

when the performance result information for the QoS flow indicates at least one of the QoS flow is accepted, information on a radio bearer to which the QoS flow is mapped, and a configuration of the radio bearer to which the QoS flow is mapped, performing at least one of configuring the radio bear according to the configuration of the radio bearer to which the QoS flow is mapped; and/or when the performance result information for the QoS flow indicates at least one of an indication that the QoS flow is released, an indication that a receiving node of downlink data of the QoS flow is changed, an indication that the buffered data of the QoS flow is forwarded, a data forwarding address, an inconsistence of that a type of the radio bearer to which the QoS flow is mapped with a type of a node which discovers the QoS flow, performing at least one of forwarding the information on the QoS flow to a specified data forwarding address, and releasing a context of the QoS flow; and/or when the performance result information for the QoS flow indicates at least one of a consistence of a type of the radio bearer to which the QoS flow is mapped with a type of a node which discovers the QoS flow and a confirmation of being capable of allocating and/or mapping the radio bearer for the QoS flow, performing at least one of confirming the a resource required by the pre-reserved radio bearer is allocated to the QoS flow, confirming that the pre-allocated radio bearer configuration is allocating to the QoS flow, confirming that the pre-mapped radio bearer is mapped for the QoS flow, and allocating and/or mapping the radio bearer resource for the QoS flow; and/or when the performance result information for the QoS flow indicates at least one of an indication that the QoS flow is refused to be accepted, an indication of reasons for refusing to accept the QoS flow, an indication that the QoS flow is released, an indication that buffered data of the QoS flow is discarded, an indication that a radio bearer pre-resource reserved for the QoS flow is released, an indication that a radio bearer configuration pre-allocated to the QoS flow is released, an indication that the radio bearer to which the QoS flow is mapped is released, performing at least one of deleting the context of the QoS flow, discarding the buffered data of the QoS flow, releasing the resource required by the radio bearer pre-reserved for the QoS flow, releasing the radio bearer configuration pre-allocated to the QoS flow, and releasing the radio bearer to which the QoS flow is pre-mapped.

According to another aspect of the disclosure, a method for operating and controlling a data flow is provided, including: determining whether to satisfy a predetermined condition; and deciding information related to transmission of a Quality-of-Service (QoS) flow, when it is determined to satisfy the predetermined condition.

Preferably, the predetermined condition includes at least one of: a condition where data of the QoS flow is transmitted through the user plane is not met, there are two or more transmission addresses for a Packet Data Unit (PDU) session at a radio access network side, a transmission address of the PDU session at a radio access network side is on a secondary node, a transmission address of the PDU session at a radio access network side is on a user plane unit, a Control Plane (CP) and a User Plane (UP) of a radio access network are split, a User Equipment (UE) is in dual-connectivity, a UE is in multi-connectivity, and an inquiry about whether to expect to receive the information on the QoS flow from a user plane is received and/or the information related to transmission of the QoS flow comprises at least one of whether to expect receive the information on the QoS flow from a user plane, whether to expect to receive the information on the QoS flow from a control plane, information on a transmission layer address of the PDU session, whether the CP and the UP of a radio access network are split, whether to configure dual-connectivity for the UE, whether to configure multi-connectivity for the UE, a number of transmission layer addresses of the PDU session at the radio access network side, and information on the PDU session; wherein the information on the transmission layer address of the PDU session comprises at least one of a master address indication, a secondary address indication, whether the transmission layer address is on a master node, whether the transmission layer address is on a secondary node, and whether the transmission layer address is used for transmitting the information on the QoS flow.

Preferably, the deciding the information related to transmission of the QoS flow includes at least one of:

when the condition where data of the QoS flow is transmitted through the user plane is not met, the information related to transmission of the QoS flow comprises at least one of an indication that the QoS flow is not received from the user plane, and an indication that the QoS flow is received from the control plane;

when there are two or more transmission addresses for the PDU session at the radio access network side, the information related to transmission of the QoS flow comprises at least one of: an indication that the information on the QoS flow is not received from the user plane; an indication that the information on the QoS flow is received from the control plane; an indication that the information on the QoS flow is received from the user plane and the information on the transmission layer address of the PDU session indicates an address on a master node; and an indication that the information on the QoS flow is received from the user plane and the information on the transmission layer address of the PDU session indicates an address used for transmitting the information on the QoS flow;

when the transmission address of the PDU session at the radio access network side is on the secondary node, the information related to transmission of the QoS flow comprises at least one of: an indication that the information on the QoS flow is not received from the user plane; an indication that the information on the QoS flow is received from the control plane; and the information on the transmission layer address of the PDU session indicating the transmission layer address is on the secondary node;

when the transmission address of the PDU session at the radio access network side is on an independent user plane node, the information related to transmission of the QoS flow comprises at least one of: an indication that the information on the QoS flow is not received from the user plane; an indication that the information on the QoS flow is received from the control plane; the CP and the UP of the radio access network node being split; and an indication that the transmission address of the PDU session at the radio access network side is on an independent user plane unit;

when the CP and the UP of the radio access network node are split, the information related to transmission of the QoS flow comprises at least one of: an indication that the information on the QoS flow is not received from the user plane; an indication that the information on the QoS flow is received from the control plane; the CP and the UP of the radio access network node being split; and an indication that the transmission address of the PDU session at the radio access network side is on an independent user plane unit;

when the UE is in dual-connectivity, the information related to transmission of the QoS flow comprises at least one of: an indication that the information on the QoS flow is not received from the user plane; an indication that the information on the QoS flow is received from the control plane; UE configured for the dual-connectivity; an indication that the information on the QoS flow is received from the user plane and the information on the transmission layer address of the PDU session indicates an address on a master node; and an indication that the information on the QoS flow is received from the user plane and the information on the transmission layer address of the PDU session indicates an address used for transmitting the information on the QoS flow; and when the UE is in multi-connectivity, the information related to transmission of the QoS flow comprises at least one of: an indication that the information on the QoS flow is not received from the user plane; an indication that the information on the QoS flow is received from the control plane; the UE configured for the multi-connectivity; an indication that the information on the QoS flow is received from the user plane and the information on the transmission layer address of the PDU session indicates an address on a master node; and an indication that the information on the QoS flow is received from the user plane and the information on the transmission layer address of the PDU session indicates an address used for transmitting the information on the QoS flow.

Preferably, a node for performing the method includes at least one of a Centralized Unit-User Plane (CU-UP), a Centralized Unit-Control Plane (CU-CP), a Master radio access network Node (MN), a Secondary radio access network Node (SN), a CP, an UP, a core network node, a radio access network node, and a UE; and/or when it is determined that the predetermined condition is satisfied, the step of deciding the information related to transmission of the QoS flow, further comprises transmitting the information related to transmission of the QoS flow to at least one of a CU-UP, a CU-CP, an MN, an SN, a CP, an UP, a core network node, a radio access network node, and a UE; and/or the QoS flow is at least one of a QoS flow which is not in a UE session context saved by the node for performing the method, a QoS flow newly added to a UE session, and a QoS flow for which no radio bearer resource is allocated and/or mapped.

According to another aspect of the disclosure, a method for operating and controlling a data flow is provided, including: acquiring information related to transmission of a Quality-of-Service (QoS) flow; and deciding whether and/or how to transmit the information on the QoS flow by means of a user plane, according to the acquired information related to transmission of the QoS flow.

Preferably, the information related to transmission of the QoS flow comprises at least one of whether to expect to receive the information on the QoS flow from the user plane, whether to expect to receive the information on the QoS flow from a control plane, information on a transmission layer address of a Packet Data Unit (PDU) session, whether a Control Plane (CP) and a User Plane (UP) of a radio access network is split, whether a User Equipment (UE) is configure for dual-connectivity, whether the UE is configured for multi-connectivity, a number of transmission layer addresses for the PDU session at the radio access network side, and information on the PDU session, wherein the information on a transmission layer address of the PDU session comprises at least one of a master address indication, a secondary address indication, whether the transmission layer address is on a master node, whether the transmission layer address is on a secondary node, and whether the transmission layer address is be used for transmitting the information on the QoS flow.

Preferably, the step of deciding whether and/or how to transmit the information on the QoS flow by means of the user plane, according to the acquired information related to transmission of the QoS flow includes at least one of:

transmitting the information on the QoS flow to the transmission layer address or transmitting the information on the QoS flow by means of the user plane, when the information related to transmission of the QoS flow satisfies one of: there is only one transmission layer address of the PDU session at a radio access network side, the CP and the UP of the radio access network are not split, a requirement of transmitting the QoS flow through the user plane is met, the transmission layer address of the PDU session is a master address, the transmission layer address of the PDU session is an address on the master node, and the transmission layer address of the PDU session is a specified address; and/or transmitting the information on the QoS flow not through the user plane or adding the information on the QoS flow by means of a control plane signaling, when the information related to transmission of the QoS flow satisfies one of: there are two or more transmission layer addresses for the PDU session at a radio access network side, there are two or more transmission layer addresses for the PDU session at a radio access network side and a master address or a secondary address is not distinguished, there are two or more transmission layer addresses for the PDU session at a radio access network side and an address on a master node or an address on a secondary node is not distinguished, there are two or more transmission layer addresses for the PDU session at a radio access network side and a transmission address of the information on the QoS flow by means of the user plane is not specified, the CP and the UP of the radio access network are split, and a requirement of transmitting the QoS flow through the user plane is not met.

Preferably, a node for performing the method includes at least one of a Centralized Unit-User Plane (CU-UP), a Centralized Unit-Control Plane (CU-CP), a Master radio access network Node (MN), a Secondary radio access network Node (SN), a CP, an UP, a core network node, a radio access network node, and a UE; and/or the information related to transmission of the QoS flow is acquired from at least one of a CU-UP, a CU-CP, an MN, an SN, a CP, an UP, a core network node, a radio access network node, and a UE; and/or the QoS flow is at least one of a QoS flow not included in a UE session context saved by the node for performing the method, a QoS flow newly added for a UE session, and a QoS flow for which no radio bearer resource is allocated and/or mapped.

According to another aspect of the disclosure, an apparatus for operating and controlling a data flow is provided, including: an acquisition module for acquiring information on a Quality-of-Service (QoS) flow and/or resource information on a node; and a decision module for deciding performance result information for the QoS flow according to the acquired resource information on the node and/or the acquired information on the QoS flow.

According to another aspect of the disclosure, an apparatus for operating and controlling a data flow is provided, including: a detection module for detecting a Quality-of-Service (QoS) flow; a receiving module for receiving performance result information for the QoS flow; and a performing module for performing an operation related to the QoS flow by performing the operation according to the performance result information for the QoS flow.

According to another aspect of the disclosure, an apparatus for operating and controlling a data flow is provided, including: a determination module for determining whether to satisfy a predetermined condition; and a decision module for deciding information related to transmission of a Quality-of-Service (QoS) flow when it is determined to satisfy the predetermined condition.

According to another aspect of the disclosure, an apparatus for operating and controlling a data flow is provided, including: an acquisition module for acquiring information related to transmission of a Quality-of-Service (QoS) flow; and a decision module for deciding whether and/or how to transmit the information on the QoS flow by means of a user plane, according to the acquired information related to transmission of the QoS flow.

MODE FOR THE INVENTION

Modern mobile communication increasingly tends to provide a user with multimedia services which are transmitted at a high rate.

As shown in FIG. 1A, it is a schematic diagram of a system architecture of System Architecture Evolution (SAE). In FIG. 1A, a User Equipment (UE) 101 is a terminal device supporting a network protocol. An Evolved Universal Terrestrial Radio Access Network (E-UTRAN) 102 is a radio access network in which a base station (eNodeB/NodeB) for providing the UE with an interface for access to the radio network is included. A Mobility Management Entity (MME) 103 is responsible for managing a mobility context, a session context of and security information on the UE. A Service Gateway (SGW) 104 mainly provides a function of a user plane, and the MME 103 and the SGW 104 may be within the same physical entity. A Packet Data Network Gateway (PGW) 105 performs functions such as charging, lawful interception and the like, and may be within the same physical entity as the SGW 104. A Policy and Charging Rules Function (PCRF) entity 106 provides Quality-of-Service (QoS) policies and charging criteria. A Serving GPRS Support Node (SGSN) 108 is a network node device for providing routing for data transmission in a Universal Mobile Telecommunications System (UMTS). A Home Subscriber Server (HSS) 109 is the UE's home subscription subsystem and is responsible for protecting user information including a current location of the user equipment, an address of the service node, user security information, a packet data context of the user equipment, and the like.

As shown in FIG. 1B, it is a schematic diagram of an initial system architecture of a next-generation network (5G). In FIG. 1B, a next-generation (NextGen) UE, a next-generation access network or a next-generation radio access network (NextGen (R)AN), a next-generation core network (NextGen CN) and a data network are included. A control plane interface between the NextGen (R)AN and the NextGen CN is NG2, and a user plane interface therebetween is NG3. The names of these interfaces are only temporary, and if the 3GPP finally decides to use other names, main content of the present disclosure will not be affected. The NextGen CN further includes a user plane function entity and a control plane function entity.

In foreseeable future, an increasing number of electrical appliances will be intelligentized, and living supplies will be interconnected, so that all of them will have a function of access to network. On one hand, a part of UEs in the future often have characteristics of being static or a low-mobility, a low-cost, as well as a small amount of non-continuous data often transmitted and received by them. For these UEs, the signaling overhead caused by setting up and releasing connections is much greater than the amount of data transmitted and received. On the other hand, in order to support more and more real-time applications such as virtual reality and the like, the latency for access to the mobile communication network in the future will be greatly reduced. In order to save the signaling overhead, improve the efficiency of data transmission and reduce the latency for access to the network by the UE, there are still many problems, which need to be solved, in the existing network.

In order to make objects, technical means and/or advantages of the present disclosure more apparent, detailed description of the present disclosure is further made below in conjunction with the accompanying drawings.

As shown in FIG. 2A, it is a schematic diagram of an architecture of a Centralized Unit/Distributed Unit (CU/DU) split in conjunction with a Control Plane/User Plane (CP/UP) split of the present disclosure. In FIG. 2A, a User Equipment (UE) 101 is a terminal device supporting a network protocol. A Distributed Unit (DU) 102 provides the UE with lower layer radio resources such as cell resources, resources and functions of RLC/MAC/PHY layer of the radio bearer and so on. A Centralized Unit-Control Plane (CU-CP) 103 provides the UE with RRC connection control. A Centralized Unit-User Plane (CU-UP) 104 provides the UE with a user plane function, such as resources and functions of the PDCP layer of the radio bearer. The resources of the radio bearer are need to be provided collectively by the CU-UP and the DU. A Uu interface is between the UE and the DU. An F1 interface for user plane connection is between the CU-UP and the DU. An F1 interface for control plane connection is between the CU-CP and the DU. A interface between the CU-CP and the CU-UP is temporarily called as an E2 interface. In some scenarios, the CU-CP and the DU are set in an integrated manner.

As shown in FIG. 2B, it is a schematic diagram of a dual-connectivity system architecture of the present disclosure. In FIG. 2B, a Master Node (MN), a Secondary Node (SN) and a UE are included. The UE is connected to the master node and the secondary node simultaneously, a Uu interface is between the UE and the master node, and a Uu interface is also between the UE and the secondary node. An X2 interface or an Xn interface is between the master node and the secondary node. The master node and the secondary node may belong to the same radio access network technology or belong to different radio access network technologies. Both the master node and the secondary node are radio access network nodes. The radio bearer set up completely on the master node may be called a Master Cell Group (MCG) bearer, and the radio bearer set up completely on the secondary node may be called a Secondary Cell Group (SCG) bearer. The radio bearer with the PDCP set up on the master node and the RLC set up both on the master node and the secondary node may be called an MCG split bearer. The radio bearer with the PDCP set up on the secondary node and the RLC set up both on the master node and the secondary node may be called an MCG split bearer.

A core network requests, through control plane signaling, a radio access network node to allocate a resource to a Packet Data Unit (PDU) session, such as setting up a data channel for the PDU session between the radio access network node and the core network user plane node, allocating a radio bearer resource and so on. The core network may request, through the control plane signaling or the user plane, the radio access network node to allocate the radio bearer resource, such as a Data Radio Bearer (DRB) data radio bearer, for a Quality-of-Service (QoS) flow. Meaning of through the user plane is that the core network directly transmits data of a new QoS flow to the radio access network node through a data channel for the PDU session, without informing the radio access network node of information on the new QoS flow through the control plane signaling.

There are some QoS flows having a non-Guaranteed Bit Rate (GBR). When its QoS is a standardized QoS and an Allocation and Retention Priority (ARP) is a default value, it may be transmitted directly to the radio access network through the user plane, without being transmitted to the radio access network or the UE through the control plane. In a dual-connectivity scenario, the data flow of the UE is offloaded to the Secondary Node (SN) under the dual-connectivity. For the core network, a number of a transmission address related to the UE session at a radio access network side may be one (a transmission address on the master node or the secondary node) or two (transmission addresses on the master node and the secondary node). In a multi-connectivity scenario, the data flow of the UE is offloaded to multiple Secondary Nodes (SNs) under the multi-connectivity. For the core network, a number of a transmission address related to the UE session at a radio access network side may be one (a transmission address on the master node or the secondary node) or more (transmission addresses on the master node and the secondary node).

Question 1: In the case of one address, the address may be the address on the master node or the address on the secondary node. When the secondary node receives the data of a new QoS flow from a data channel, it is unclear whether the master node or the secondary node decides to allocate the radio resource to the new QoS flow.

Question 2: In the case of two or more addresses, when a new QoS flow is generated, the transmission address, to which the core network node should transmit the QoS flow, is unclear. In general, it should be transmitted to the node that can decide the radio resource for the new QoS flow as much as possible.

Question 3: When the master node decides the radio resource for a new QoS flow, if the QoS flow arrives at the transmission address on the secondary node, the master node will not decide the radio resource for this new QoS flow. Without the radio resource, the data of the QoS flow has to be discarded.

Question 4: When the secondary node decides a radio bearer mapping, if the QoS flow arrives at the transmission address on the master node, the secondary node will not decide the radio resource for this new QoS flow. Without the radio resource, the data of the QoS flow has to be discarded.

In a scenario where the control plane and the user plane of the radio access network node are split, the radio access network may be divided into a centralized unit (CU) and a distributed unit (DU), the CU unit may be further divided into a control plane unit (CU-CP) and a user plane unit (CU-UP), and the new QoS flow transmitted through the user plane arrives at the CU-UP.

Question 1: Maybe the CU-CP decides the radio resource for the QoS flow, or maybe the CU-UP decides the radio resource for the QoS flow.

When the CU-CP decides, if a QoS flow arrives at the CP-UP, the CU-CP cannot decide the radio resource configuration for this QoS flow.

When the CU-UP decides, since resources of the radio bearer includes a PDCP, a RLC, a logical channel and the like, the resource of the PDCP is on the CU-UP, the resources of the other radio bearers are on the DU, the CU-UP lacks necessary information to decide an appropriate radio resource configuration.

Hereinafter, embodiments of the present disclosure will be described in detail. Examples of the embodiments are illustrated in the accompanying drawings, in which the same or similar reference numerals denote the same or similar elements or elements having the same or similar functions throughout. The embodiments described below with reference to the drawings are exemplary, are only used to explain the present disclosure, and cannot be construed as limiting the present disclosure.

Those of ordinary skill in the art may understand that, unless otherwise defined, all terms (including technical and scientific terms) used herein have the same meaning as commonly understood by those of ordinary skill in the art to which the present disclosure belongs. It should also be understood that terms such as those defined in a general dictionary should be understood as having a meaning that is consistent with the meaning in the context of the prior art, and will not be construed in an idealized or overly formal meaning unless specifically defined as here.

For the convenience of understanding of technical solutions of the present disclosure, it is necessary to first make a preamble description on the principles of the present disclosure and respective terms.

Some terms in this document are described as follows.

In some embodiments, the radio access network node may include at least one of: a base station, an eNB, a NodeB, a gNB, a radio access network center control unit (CU, such as a gNB-CU), a radio access network center control unit-control Plane (CU-CP), a radio access network center control unit-user plane (CU-UP), a user plane (UP) node, a control plane (CP) unit, a radio access network node distribution unit (DU, such as a gNB-DU), a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by a UE. In a next-generation network, the concept of a node may be virtualized as a function or a unit. The radio access network center control unit may connect multiple radio access network node distribution units.

The UE may be at least further distinguished as one of the following: an overall UE, a non-access stratum (such as a NA layer) of the UE, an access stratum (such as an AS layer) of the UE, and an application layer (such as an APP layer) of the UE.

In some embodiments, the core network node may include at least one of: an MME, an SGSN, an SGW, an Access and Mobility Management Function (AMF), an Session Management Function (SMF), a User Plane Function (UPF), a core network control node, a core network user plane node, a core network control plane function, a core network user plane function, a core network control plane unit, a core network user plane unit, and the like. In the next-generation network, the concept of the node may be virtualized as a function or a unit.

In some embodiments, the core network control node may be an MME, an SGSN, an AMF, an SMF, a core network control plane function, a core network control plane unit, or the like.

In some embodiments, the core network user plane node may be an SGW, an SGSN, a UPF, a core network user plane function, a core network user plane unit, a network slice, or the like.

The expression "allocate/map a radio bearer" mentioned in this document means to allocate and/or map a radio bearer, unless otherwise specified.

The expression "QoS flow" or "new QoS flow" mentioned in this document is at least one of: a QoS flow in a UE session context that is not saved in a node, a QoS flow newly added in a UE session, and a QoS flow to which no radio bearer resource is allocated/mapped.

FIG. 3 is a flow chart of a first method of operating and controlling a data flow of the present disclosure. As shown in FIG. 3, this flow includes the following steps.

At step 301, the first node acquires information on a new QoS flow and/or acquires resource information on a node.

Optionally, the information on the new QoS flow is as described at step 4-101, which is not be repeated here. The new QoS flow may be at least one of: a QoS flow in a UE session context that is not saved in a node, a QoS flow newly added in a UE session, and a QoS flow for which no radio bearer resource is allocated/mapped.

In some embodiments, the first node receives the information on the new QoS flow from a second node. At this time, the information on the new QoS flow may include at least one of:

a context of the new QoS flow (optionally, the context of the QoS flow includes at least one of: an identity of the context of the QoS flow, a QoS profile of the QoS flow (such as QoS parameter requirements of the QoS flow), and QoS rules of the QoS flow);

a request for allocating a resource to the new QoS flow;

an indication that a resource of the second node can accept the new QoS flow;

an indication that the second node has pre-reserved a resource required for a radio bearer for the new QoS flow;

an indication of a radio bearer pre-allocated and/or pre-mapped for the new QoS flow by the second node;

an indication that the second node refuses to accept the new QoS flow;

reasons why the second node refuses to accept the new QoS flow; and an inquiry about whether resources of the first node and/or a third node can be accept the new QoS flow.

Optionally, the first node may acquire the information on the new QoS flow by the one following way of:

discovering a new QoS flow from an QoS flow identity carried in data received from a data channel for the PDU session;

information on a received new QoS flow; and receiving a QoS flow setup request or a QoS flow resource allocation request, thereby discovering a new QoS flow.

In some embodiments, the new QoS flow may have characteristics of a standardized QoS (e.g., a standardized 5QI), a default ARP, and a non-GBR. It is not difficult to understand that a QoS Flow Identity (QFI) of the standardized QoS flow is consistent with the 5G QoS Indicator (5QI). Therefore, QoS parameters such as 5QI, ARP, and/or non-GBR can be derived from the QFI by the QFI contained in a header of a data packet of the QoS flow received through the user plane. Thus, it is not necessary to obtain QFI-related QoS parameters from the control plane.

Optionally, the resource information on a node may include at least one of resource information on a Distributed Unit (DU), resource information on a Centralized Unit-Control Plane (CU-CP) unit, resource information received by a Centralized Unit-User Plane (CU-UP) unit, resource information on a Master radio access network Node (MN), and resource information on a Secondary radio access network Node (SN). In some embodiments, the resource information on the node reflects a resource condition of the node.

It is not difficult to understand that the resources required for transmitting the data of the QoS flow are radio bearers. The radio bearer configuration requires configurations of the PDCP, the RLC, the logical channel and the like. In the scenario of the CU/DU split and the CP/UP split, the PDCP is on the CU-UP, and the RLC and the logical channel and the like are on the DU. Therefore, one node cannot independently decide whether to accept a new QoS flow. The resource condition of the DU and the resource condition of the CU-UP are required to determine whether to meet the requirement of the new QoS flow, and whether the required radio bearer resource can be allocated/mapped for the QoS flow. In the dual-connectivity scenario, in the case of the MCG split, the PDCP is on the MN, and the RLC, the logical channel and the like are on the SN; and in the case of the SCG split, the PDCP is on the SN, and the RLC, the logical channel and the like are on the MN. Therefore, the resource condition of the MN and the resource condition of the SN are required to determine whether to meet the requirement of the new QoS flow, and whether the required radio bearer resource can be allocated/mapped for the QoS flow.

Optionally, the first node may acquire the resource information on the node through one of: receiving resource information of the DU from the CU-CP, receiving resource information of the DU from the DU, receiving resource information of the CU-UP from the CU-UP, and receiving resource information of the CU-UP from the CU-CP. In some embodiments, when the first node is a CU-UP, the resource information of the DU may be received from the CU-CP. In some embodiments, when the first node is a CU-CP, the resource information of the DU may be obtained from the DU, and/or the resource information of the CU-UP may be obtained from the CU-UP.

The resource information of the CU-CP may include at least one of: an identity of the CU-CP (e.g., an identity of the gNB), hardware load information, transmission layer load information on an interface (e.g., an NG interface, and/or an NG interface control plane) between the core network and the radio access network node, transmission layer load information on an interface (e.g., an F1 interface, and/or an F1 interface control plane) between the CU-CP and the DU, transmission layer load information on an interface (e.g., an E2 interface and/or an E2 interface control plane) between the CP and the UP, and a maximum number of UEs that can be served.

The resource information of the CU-UP may include at least one of: an identity of the CU-UP, an area (such as a tracking area, TA) supported by the CU-UP, hardware load information, transmission layer load information on an interface (e.g., an NG interface, and/or an NG interface control plane and the like) between the core network and the radio access network node, transmission layer load information on an interface (e.g., an F1 interface, an F1 interface control plane, and an F1 interface user plane) between the CU and the DU, transmission layer load information on an interface (e.g., an E2 interface) between the CP and the UP, resource information on the PDCP, a maximum number of UEs that can be served, a maximum GBR transmission rate that can be provided, and a maximum transmission rate that can be provided.

The resource information of the DU may include at least one of: an identity of the DU, an area (such as a TA) supported by the DU, hardware load, transmission layer load information on an interface (such as an F1 interface, an F1 interface control plane, and/or an F1 interface user plane) between the CU and the DU, resource information on a cell managed by the DU, an MAC resource information, a RLC layer resource, a logical channel resource, a maximum number of UEs that can be served, a maximum GBR transmission rate that can be provided, and a maximum transmission rate that can be provided.

The resource information on the cell may include at least one of: an identity of the cell, an area (such as a TA) supported by the cell, and information on a physical resource block of the cell, such as:

a downlink GBR Physical Resource Block (PRB) usage (DL GBR PRB usage), an uplink GBR Physical Resource Block (PRB) usage (UL GBR PRB usage), a downlink non-GBR Physical Resource Block (PRB) usage (DL non-GBR PRB usage), an uplink non-GBR Physical Resource Block (PRB) usage (UL non-GBR PRB usage), a downlink total GBR Physical Resource Block (PRB) usage (DL Total PRB usage), and/or an uplink total GBR Physical Resource Block (PRB) usage (UL Total PRB usage).

In some embodiments, the first node cannot independently decide whether to accept the new QoS flow according to its own resource condition. The first node may decide whether to accept the new QoS flow in conjunction with resources of other nodes.

The first node is a CU-CP, which can obtain resource information of the CU-UP from the CU-UP and resource information of the DU from the DU. The first node may decide whether it is sufficient to allocate/map the radio bearer resource for the new QoS flow in conjunction with the resource information of the CU-UP and the resource information of the DU. The first node may obtain the resource information of the CU-UP while acquiring information on the new QoS flow from the CU-UP.

The first node is a CU-UP, which may receive resource information of the DU from the CU-CP. The first node may decide whether it is sufficient to allocate/map the radio bearer resource for the new QoS flow in conjunction with the resource information of the CU-UP and the resource information of the DU.

The first node is an MN, which may receive resource information of the SN from the SN. The first node may decide whether it is sufficient to allocate/map the radio bearer resource for the new QoS flow in conjunction with the resource information of the MN and/or the resource information of the SN, and may decide a type of the downlink bearer for the downlink new QoS flow (an MCG, an MCG Split, an SCG, and/or an SCG Split, etc.).

The first node is an SN, and resource information of the MN may be received from the MN. The first node may decide whether it is sufficient to allocate/map the radio bearer resource for the new QoS flow in conjunction with the resource information of the MN and/or the resource information of the SN, and may decide a type of the downlink bearer for the downlink new QoS flow (an MCG, an MCG Split, an SCG, and/or an SCG Split, etc.).

The first node acquiring the resource information on the node further includes acquiring access information on the UE, and being capable of performing at least one of: associating the resource information on the node related to the UE or requesting for the resource information on the node related to the UE according to the access information on the UE, seeing Step 4-201 and Step 4-202 for details.

Optionally, the first node, the second node, and/or the third node include at least one of: a CU, a DU, a CU-CP, a CU-UP, an MN, an SN, a core network, a radio access network, a gNB, and a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by a UE.

Optionally, the first node may acquire information on a new QoS flow and/or resource information from at least one of: a CU, a DU, a CU-CP, a CU-UP, a CP, a UP, an MN, an SN, a core network, a radio access network, a gNB, and a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by the UE.

At step 302, the first node decides performance result information for the new QoS flow according to the acquired information for the new QoS flow and/or the acquired resource information on the node.

The performance result information for the new QoS flow may include whether to accept the new QoS flow. Whether to accept the new QoS flow includes one of: whether the resource of the node can meet a requirement of the new QoS flow, and whether a radio bearer resource are allocated/mapped for the new QoS flow. Optionally, when the first node decides to accept the new QoS flow, a type of the radio bearer to which the new QoS flow is mapped may be further decided.

In some embodiments, the first node decides whether to accept the new QoS flow according to the newly acquired resource information on the node. In some embodiments, the first node cannot independently decide whether to accept the new QoS flow according to its own resource information. The first node may decide whether to accept the new QoS flow in conjunction with resource information on other nodes.

For example, when both the resource of the DU and the resource of the CU-UP can meet the requirement of the new QoS flow, the new QoS flow may be accepted.

For example, when the resource of the DU or the resource of the CU-UP cannot meet the requirement of the new QoS flow, the new QoS flow may be refused to be accepted.

For example, when the resource of the MN can independently meet the requirement of the new QoS flow, the new QoS flow may be accepted, and/or the type of the radio bearer to which the QoS flow is mapped is set to be the MCG.

For example, when the resource of the SN can independently meet the requirement of the new QoS flow, the new QoS flow may be accepted, and/or the type of the radio bearer to which the QoS flow is mapped is set to be the SCG.

For example, when each of the resource of the MN and the resource of the SN cannot independently meet the requirement of the new QoS flow, but both of them can collectively meet the requirement of the new QoS flow, the new QoS flow may be accepted, and/or the type of the radio bearer to which the QoS flow is mapped is set to be the MCG split or the SCG split. It is not difficult to understand that data of the new QoS flow can be transmitted on the MN and the SN at the same time by means of the MCG split or the SCG split.

For example, when both the resource of the MN and the resource of the SN cannot collectively meet the requirement of the new QoS flow, the new QoS flow may be refused.

When the resource of the MN or the resource of the SN can meet the requirement of the new QoS flow, the new QoS flow is accepted.

For example, when the resource of the MN or the resource of the SN cannot meet the requirement of the new QoS flow, the new QoS flow may be refused.

Optionally, when the first node decides to accept the new QoS flow, it may perform at least one of operations including but not limiting to:

allocating/mapping a radio bearer resource for the new QoS flow, specifying a bearer type (an MCG, an SCG, an SCG Split, an MCG Split) of the radio bearer to which the new QoS flow is mapped, specifying, for the new QoS flow, a transmission layer address (e.g., a transmission layer address of the master node or a transmission layer address of the secondary node) at a radio access network side at an interface (e.g., an NG interface) between the radio access network and the core network, allocating a data forwarding address to the new QoS flow (for example, when the data arrives at the SN, but the first node decides to map the QoS flow to the MCG bearer or the MCG Split bearer, or the first node specifies an address on the MN as a transmission layer address of the NG interface for the QoS flow; at this time, the SN needs to forward the received data of the new QoS flow to the MN. On the contrary, when the data arrives at the MN, but the first node decides to map the QoS flow to the SCG bearer or the SCG Split bearer, or the first node specifies an address on the SN as a transmission layer address of the NG interface for the QoS flow; at this time, the MN needs to forward the received data of the new QoS flow to the SN), specifying a serving cell for the new QoS flow, and transmitting the decided performance result information for the new QoS flow, such as at least one of:

an indication that the new QoS flow is accepted, information on the radio bearer to which the new QoS flow is mapped, a configuration of the radio bearer to which the new QoS flow is mapped, a transmission layer address at a radio access network side for the new QoS flow at an interface (e.g., an NG interface) between the radio access network and the core network (e.g., the core network is informed of updating the transmission address of downlink data of the new QoS flow to a specified address), an indication (e.g., to the core network) that the transmission address of the downlink data of the new QoS flow is updated, an indication that a receiving node for the downlink data of the new QoS flow is changed, an indication (e.g., to the second node) that the buffered data of the new QoS flow is forwarded, a data forwarding address of the new QoS flow, and information on confirmation of being capable of allocating/mapping a radio bearer for the new QoS flow (e.g., by the second node).

Optionally, the information on the radio bearer may include at least one of an identity of the radio bearer (such as a DRB identity), a type of the radio bearer (an MCG, an SCG, an MCG split, and/or an SCG split), a QoS requirement of the radio bearer, information on the QoS flow mapped to the radio bearer (such as an identity of the QoS flow), and a configuration of the radio bearer.

Optionally, the configuration of the radio bearer may include at least one of a Service Data Adaptation Protocol (SDAP) configuration, a PDCP configuration, a RLC configuration, a logical channel configuration, an MAC layer configuration, and a physical layer configuration. In some embodiments, the SDAP layer configuration and/or the PDCP layer configuration of the radio bearer to which the new QoS flow is mapped may be transmitted to the CU-UP; and the RLC configuration, the logical channel configuration, the MAC layer configuration, and the physical layer configuration of the radio bearer to which the new QoS flow is mapped may be transmitted to the DU.

For the behavior of "specifying a serving cell for the new QoS flow", it is not difficult to understand that when the first node is a CU-CP, the cell is managed by the DU. When the new QoS flow is accepted, the serving cell needs to be specified for the new QoS flow.

For the behavior of "allocating a data forwarding address to the new QoS flow", it is not difficult to understand that there is one scenario where the new QoS flow is transmitted to the first node by the SN, when the first node is an MN. When the new QoS flow is accepted and the bearer to which the new QoS flow is mapped is an MCG bearer or an MCG split bearer, the first node needs to allocate a data forwarding address to the new QoS flow and in from the SN of forwarding the data of the new QoS flow. On the contrary, the first node is an SN. When the node at which the QoS flow arrives is the MN, but the bearer to which the QoS flow is mapped is an SCG bearer or an SCG split bearer, the first node needs to allocate a data forwarding address for the new QoS flow and inform the MN of forwarding the data of the new QoS flow.

Optionally, when the first node decides to refuse to accept the new QoS flow, it may perform at least one of operations including but not limiting to:

discarding the buffered data of the new QoS flow, informing the core network of refusal to accept the new QoS flow by the radio access network and/or reasons for the refusal (once the core network receives it, the core network may not transmit the data of the new QoS flow to the radio access network), and transmitting the performance result information for the new QoS flow, such as at least one of:

an indication that the new QoS flow is refused to be accepted (such as the core network and the second node are informed that the radio access network cannot meet the requirement of the new QoS flow), an indication of reasons why the new QoS flow is refused to be accepted, an indication (e.g., to the second node) that the new QoS flow is released, an indication (e.g., to the second node) that buffered data of the new QoS flow is discarded, an indication (e.g., to the second node) that a radio bearer resource pre-reserved for the new QoS flow is released, an indication (e.g., to the second node) that a radio bearer configuration pre-allocated to the new QoS flow is released, and an indication (e.g., to the second node) that the radio bearer to which the new QoS flow is mapped is released.

In an embodiment, if the first node is a CU-CP, when the new QoS flow is informed by the CU-UP, and the QoS flow is not accepted, the CU-CP informs the CU-UP of releasing the buffered data of the QoS flow. The CU-CP may also inform the core network of being not capable of meeting the requirement of the new QoS flow and/or reasons for being not capable of meeting.

In an embodiment, if the first node is a CU-UP, when the QoS flow arrives at the CU-UP and is not accepted by the CU-UP, the CU-UP may inform the CU-CP of the performance result information on refusal to accept the new QoS flow. After receiving the above information, the CU-CP may inform the core network node that the new QoS flow is not accepted, and of reasons for being not accepted, such as insufficient resources. Once receiving it, the core network may not transmit the data of the new QoS flow to the CP-UP.

In an embodiment, if the first node is an MN, when the QoS flow is informed by the SN, and the QoS flow is not accepted, the SN is informed of releasing the buffered data of the QoS flow.

In an embodiment, if the first node is an SN, when the QoS flow arrives at the SN and is not accepted by the SN, the SN needs to inform the MN, and the MN may inform the core network node that the new QoS flow is not accepted, and of reasons for being not accepted, such as insufficient resources.

Optionally, the performance result information for the new QoS flow may include at least one of:
- an indication whether to accept the new QoS flow,
- information on the radio bearer to which the new QoS flow is mapped (as mentioned above, it will not be repeated here),
- a configuration of the radio bearer to which the new QoS flow is mapped,
- an indication of reasons for refusal to accept the new QoS flow,
- an indication that a receiving node for the downlink data of the new QoS flow is changed,
- an indication (e.g., to the second node) that the new QoS flow is released,
- an indication (e.g., to the second node) that the buffered data of the new QoS flow is discarded,
- an indication (e.g., to the second node) that a radio bearer resource reserved for the new QoS flow is released,
- an indication (e.g., to the second node) that a radio bearer configuration pre-allocated to the new QoS flow is released,
- an indication (e.g., to the second node) that a radio bearer to which the new QoS flow is mapped is released,
- an indication of a transmission layer address at a radio access network side for the new QoS flow at an interface between the radio access network and the core network,
- an indication (e.g., to the core network) that a transmission address of the downlink data of the new QoS flow is updated,
- an indication (e.g., to the second node) that the buffered data of the new QoS flow is forwarded,
- a data forwarding address of the new QoS flow, and
- confirmation (e.g., by the second node) of being capable of allocating/mapping a radio bearer for the new QoS flow.

It is not difficult to understand that the performance result of the new QoS flow may include: 1) confirmation of accepting the QoS flow and allocating a radio bearer resource to the QoS flow; 2) confirmation of refusal to accept the QoS flow and informing of releasing o the resource pre-reserved for the new QoS flow; 3) confirmation of accepting the QoS flow (confirmation that the resource meets the requirement of the new QoS flow) but allocating no resource, and informing the node that discovers the QoS flows of allocating a radio bearer resource to the QoS flow; 4) confirmation of accepting the QoS flow, transferring a downlink transmission address of the new QoS flow as the master node, and informing the node that discovers the QoS flow of forwarding the buffered data of the new QoS flow.

In some embodiments, the first node (such as the master node) receives information on the new QoS flow from the second node (such as the secondary node), and the first node decides to transfer the receiving node for downlink data of the new QoS flow as the first node, i.e., the core network user plane is informed of transmitting the data of the new QoS flow to the transmission address on the first node. The first node will informs the second node of one data forwarding address, and requests the second node for forwarding the buffered data of the new QoS flow to the specified data forwarding address.

In an embodiment, the first node receives the information on the QoS flow from the second node, and the method further includes: transmitting, by the first node, the decided performance result information for the QoS flow to the second node.

In an embodiment, receiving, by the first node, the resource information of the DU from the CU-CP further includes: requesting, by the first node, the CU-CP for the resource information of the DU; or, after the first node inquires the CU-CP about whether the resource information of the DU is capable of accepting the QoS flow, receiving, by the first node, the resource information of the DU from the CU-CP.

In an embodiment, before the first node receives the resource information on the node, the method further includes requesting, by the first node, a node which transmits the resource information on the node for the resource information on the node, or inquiring, by the first node, a node which transmits the resource information on the node about whether the resource information on the node is capable of accepting the QoS flow.

Optionally, the first node transmits the acquired information on the new QoS flow, the acquired resource information on the node, and the performance result information for the new QoS flow to at least one of: a CU, a DU, a CU-CP, a CU-UP, an MN, an SN, a CP, an UP, a core network, a radio access network, a gNB, and a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by a UE.

FIG. 4A is a flow chart of a second method of operating and controlling a data flow of the present disclosure. As shown in FIG. 4A, the flow includes the following steps.

At step 4-101, the second node detects a new QoS flow and performs an operation related to the new QoS flow.

The second node may detect the new QoS flow by one of: detecting a new QoS flow from a QoS flow identity of the received data of the QoS flow, discovering a new QoS flow from the received discovery information on the QoS flow, and discovering a new QoS flow from the received resource allocation request for the QoS flow. The new QoS flow may be at least one of a QoS flow in a UE session context that is not saved in the second node, a QoS flow newly added for a UE session, and a QoS flow for which no radio bearer resource is allocated and/or mapped.

Optionally, performing, by the second node, the operation related to the new QoS flow may include at least one of:
- buffering data of the new QoS flow,
- determining whether the new QoS flow can be accepted,
- pre-reserving a resource required by a radio bearer for the new QoS flow,
- pre-configuring and/or pre-mapping information on a radio bearer for the new QoS flow (the information on the radio bearer is described at step 302, which will not be repeated here; for example, the configuration of PDCP), and transmitting the information on the new QoS flow (in some embodiments, to the control plane node or a node that can allocate a radio bearer resource to the new QoS flow).

Optionally, the information on the new QoS flow includes at least one of:

a context of the new QoS flow (optionally, the context of the QoS flow includes at least one of: an identity of the context of the QoS flow, a QoS profile of the QoS flow (such as QoS parameter requirements of the QoS flow), and QoS rules of the QoS flow);

a resource allocation request (such as a request for allocating/mapping a radio bearer (such as DRB) resource for the new QoS flow);

an indication that the new QoS flow can be accepted (the second node can accept it, and acceptance of other nodes are required to allocate/map a radio bearer for the QoS flow);

an indication that a resource required by a radio bearer has been pre-reserved for the new QoS flow (such as the PDCP layer resource required by the radio bearer);

information on a radio bearer pre-allocated/pre-mapped for the new QoS flow (such as an identity of the radio bearer and a configuration of the PDCP layer);

an indication that the new QoS flow is refused to be accepted and/or of reasons for the refusal (such as QoS parameter requirements of the QoS flow cannot be met, a radio bearer cannot be allocated/mapped for the QoS flow); and an inquiry whether the resource conditions of the first node and/or a third node (a DU, a CU-CP, a CU-UP, an MN, and/or an SN) can accept the new QoS flow.

In some embodiments, after the second node discovers the new QoS flow, it may not be able to decide on its own whether the complete radio bearer resource can be configured for the new QoS flow. At this time, the first node may first decide whether the resource on the first node can be accept the new QoS flow, and then may transmit an indication on whether to accept the new QoS flow to other nodes as a reference. Other nodes can generally decide whether to accept the new QoS flow in conjunction with resource conditions of other nodes.

In some embodiments, after the second node discovers a new QoS flow through the user plane, it may first buffer the data of the new QoS. The second node may transmit the information on the discovered new QoS flow to other nodes, such as to a node that can decide a radio bearer for the new QoS flow. It is not difficult to understand that if other nodes reply that a radio bearer resource cannot be allocated to the new QoS flow, the second node may discard the buffered data of the new QoS flow. If the other nodes return that a radio bearer may be allocated/mapped for the new QoS, the second node may map the data of the new QoS flow to the data of the radio bearer to be forwarded.

In some embodiments, the radio bearer resource required for the QoS flow need to be provided by multiple nodes such as the CU-UP and the DU. If one of the nodes cannot accept the new QoS flow, the radio bearer resource cannot be allocated/mapped for the QoS flow. When the second node is one (such as the CU-UP) of nodes which provide the radio bearer resources, the second node may first confirm whether the new QoS flow can be accepted, and pre-reserve the radio bearer resource on the second node for the new QoS flow first, and/or pre-allocate/pre-map the radio bearer resource on the second node. The second node informs the control node (such as the CU-CP) that can decide the radio bearer for the QoS flow of the result that the new QoS flow can be accepted. The control node can finally decide whether the new QoS flow can be accepted (such as allocating/mapping the radio bearer for the new QoS flow) in conjunction with whether the radio bearer resources on other nodes (such as the DU) can meet requirements of the QoS flow. For the QoS flow which cannot be accepted, the second node should be informed of releasing the reserved resource.

In some embodiments, after the second node discovers a new QoS flow, if it cannot accept the new QoS flow, it can indicate to other nodes (such as a node connected to the core network control plane) that the new QoS flow cannot be accepted. Other nodes can inform the core network that the radio access network cannot accept the new QoS flow. It is not difficult to understand that for the QoS flow that is not accepted by the radio access network, the core network may stop pushing the data of the QoS flow to the radio access network.

In some embodiments, the second node may decide whether to transmit the information on the new QoS flow according to the current UE's bearer type. When the second node is an SN, and the bearer type of the UE is an SCG bearer or an SCG split bearer, the second node may not transmit the information on the new QoS flow to the MN. It is not difficult to understand that for the SCG bearer or the SCG split bearer, the SN can directly decide a bearer to which the new QoS flow is mapped. On the contrary, when the second node is an MN, and the bearer type of the UE is an MCG bearer or an MCG split bearer, the second node may not transmit the information on the new QoS flow to the SN.

At step 4-102, the second node receives performance result information for the new QoS flow.

In some embodiments, for the information on the transmitted new QoS, the second node receives the returned performance result information for the new QoS flow.

The performance result information for the new QoS flow is described at step 302 and will not be repeated here.

At step 4-103, the second node performs an operation according to the performance result information for the new QoS flow.

Optionally, when the performance result information for the QoS flow indicates at least one of an indication of accepting the new QoS flow, information on a radio bearer to which the new QoS flow is mapped, and a configuration of the radio bearer to which the new QoS flow is mapped, the second node may perform at least one of configuring according to the configuration of the radio bearer to which the new QoS flow is mapped.

Optionally, when the performance result information for the QoS flow indicates at least one of an indication that the new QoS flow is released, an indication that a receiving node of downlink data of the new QoS flow is changed, an indication that the buffered data of the new QoS flow is forwarded, a data forwarding address, an inconsistence of a type of the radio bearer to which the new QoS flow is mapped with a type of a node which discovers the QoS flow (e.g., the new QoS flow is discovered by the MN, but the type of the mapped radio bearer is an SCG/SCG split; e.g., the new QoS flow is discovered by the SN, but the type of the mapped radio bearer is an MCG/MCG split), the second node may perform at least one of forwarding the information on the new QoS flow to a specified data forwarding address, and releasing a context of the new QoS flow (e.g., after the data forwarding is completed).

Optionally, when the performance result information for the QoS flow indicates at least one of a consistence of a type of the radio bearer to which the new QoS flow is mapped with a type of a node which discovers the new QoS flow (e.g., the new QoS flow is discovered by the SN, and the type of the radio bearer mapped is an SCG/SCG split; e.g., the new QoS flow is discovered by the MN, and the type of the radio bearer mapped is an MCG/MCG split) and a confirmation (e.g., by the second node) that the radio bearer is capable of being allocated/mapped for new the QoS flow, the second node may perform at least one of:

confirming that a resource required by the reserved radio bearer is allocated to the new QoS flow, confirming that the pre-allocated radio bearer configuration is allocated to the new QoS flow, confirming that the pre-mapped radio bearer is mapped for the new QoS flow, and allocating/mapping the radio bearer resource for the new QoS flow.

Optionally, when the performance result information for the QoS flow indicates at least one of an indication that the new QoS flow is refused to be accepted, an indication of reasons for refusing to accept the new QoS flow, an indication that the new QoS flow is released, an indication that buffered data of the new QoS flow is discarded, an indication that a radio bearer resource pre-reserved for the new QoS flow is released, an indication that a radio bearer configuration pre-allocated to the new QoS flow is released, an indication that the radio bearer to which the new QoS flow is mapped is released, the second node may perform at least one of:

deleting the context of the new QoS flow (such as an identity of the QoS flow, a QoS profile of the QoS flow, and QoS rules of the QoS flow), discarding the buffered data of the new QoS flow;

releasing a resource required by the radio bearer pre-reserved for the new QoS flow (such as the PDCP layer resource required by the radio bearer), releasing the radio bearer configuration pre-allocated to the new QoS flow, and releasing the radio bearer to which the QoS flow is pre-mapped.

FIG. 4B is a flow chart of a third method of operating and controlling a data flow of the present disclosure. As shown in FIG. 4B, the flow includes the following steps.

At step 4-201, access information on a UE and/or resource information on a node are acquired.

The access information on the UE includes at least one of information on a cell accessed by the UE (e.g., a cell identity), information on a DU accessed by the UE (e.g., a DU identity, a supported TA, and the like).

The resource information on the node is described at step 301 and will not be repeated here.

Optionally, the access information on the UE and/or the resource information on the node may be acquired from at least one of a CU, a DU, a CU-CP, a CU-UP, a CP, an UP, an MN, an SN, a core network, a radio access network, a gNB, and a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by a UE.

At step 4-202, according to the access information on the UE, the resource information on the node related to the UE is associated or requested, and/or the acquired resource information on the node is transmitted.

According to the access information on the UE, the node accessed by the UE may be associated with. In some embodiments, according to the information on the cell accessed by the UE or the information of the DU accessed by the UE, the DU accessed by the UE may be associated with.

In some embodiments, resource information of the DU has been obtained. According to the DU accessed by the UE, the resource information of the DU accessed by the UE may be known in an association manner, and it is determined whether the resource of the DU accessed by the UE can meet the requirement of the new QoS flow of the UE.

In other embodiments, the resource of the DU is not yet obtained, and according to the DU accessed by the UE, the resource condition of the DU accessed by the UE may be requested. When the node for performing the third method is a CU-UP, the request may be transmitted to the CU-CP first, and then the CU-CP may forward it to the specified DU. Such a request contains routing information of the CU-UP.

In some embodiments, when the node for performing the method is a CU-CP, after receiving the resource information of the DU from the DU, it transmits the received resource information of the DU to the CU-UP.

Optionally, the node for performing the method may be at least one of: a CU, a DU, a CU-CP, a CU-UP, a CU, an UP, an MN, an SN, a core network, a radio access network, a gNB, a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by a UE.

Optionally, the acquired resource information on the node may be transmitted to at least one of: a CU, a DU, a CU-CP, a CU-UP, a CU, an UP, an MN, an SN, a core network, a radio access network, a gNB, a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of a UE, a radio access network node suspending a UE, and a radio access network node to which a connection is requested to be restored by a UE.

FIG. 5 is a flow chart of a fourth method of operating and controlling a data flow of the present disclosure. As shown in FIG. 5, the flow includes the following steps.

At step 501, it is determined whether a predetermined condition is satisfied.

Optionally, the predetermined condition may include at least one of: a condition where data of the QoS flow are transmitted through the user plane is not met, there are two or more transmission addresses for a PDU session at a radio access network side, a transmission address of the PDU session at a radio access network side is on a secondary node, a transmission address of the PDU session at a radio access network side is on a independent user plane node (e.g., the CU-CP), a CP and a UP of a radio access network are split, a UE is in dual-connectivity, a UE is in multi-connectivity, and an inquiry request on whether to expect to receive the information on the QoS flow from a user plane is received In an embodiment, when the UE is in dual-connectivity, the PDU session may has two transmission layer addresses, which are on the master node and the secondary node, at the radio access network side. For example, the master node offloads a part of QoS flows in the PDU session to the secondary node.

In an embodiment, when the UE is in multi-connectivity, the PDU session may has multiple transmission layer addresses, which are on the master node and the secondary node, at the radio access network side.

In an embodiment, when the UE is in dual-connectivity, the transmission address of the PDU session at the radio access network side may be on a secondary node. For example, the master node offloads the entire data of the PDU session to the secondary node.

It is not difficult to understand that when the UE is in dual-connectivity or multi-connectivity, the node connected with the core network control plane is the master node. In general, the master node may decide to offload the QoS flow or the PDU session to the secondary node. If a new QoS flow is directly transmitted through the user plane, and the address to which the new QoS flow is transmitted is a transmission address on the secondary node, some interaction signalings between the master node and the secondary node will be certainly brought, such as coordination of radio bearer resources. Therefore, by differentiating the transmission layer address on the master node from the transmission layer address on the secondary node, the core network node can be helped to transmit the new QoS flow to the transmission address on the master node, thereby reducing the interaction signalings between the master node and the secondary node.

It is not difficult to understand that the UE is in dual-connectivity or multi-connectivity, the node that decides the radio bear to which the QoS flow is mapped in the PDU session may be a master node or a secondary node. For example, the MCG bearer, the MCG split bearer may be the bear to which the QoS flow is mapped decided by the master node; and the SCG bear, the SCG split bear may be the bear to which the QoS flow is mapped decided by the secondary node. In this case, the core network may be informed of the transmission address in the PDU session at which the QoS flow is controlled to arrive on the node to which the radio bearer is mapped, and the core network can use it to transmit the new QoS flow by means of the user plane, which can save the interaction between the nodes.

At step 502, when it is determined that the predetermined condition is satisfied, the information related to transmission of the new QoS flow is decided.

Optionally, the information related to transmission of the new QoS flow may include at least one of whether to expect receive the information on the new QoS flow from a user plane, whether to expect to receive the information on the new QoS flow from a control plane, information on a transmission layer address of the PDU session, a transmission layer address of the PDU session at a radio access network side is on an independent user plane node, whether the CP and the UP of a radio access network is split, whether a dual-connectivity is configured for the UE, whether a multi-connectivity is configured for the UE, a number (such as one, two or more) of transmission layer addresses for the PDU session at the radio access network side, and information on the PDU session.

Optionally, when it is determined to satisfy the predetermined condition, deciding the information related to transmission of the new QoS flow includes one of:
  when the condition of transmitting the data of the new QoS flow through the user plane is not met, the information related to transmission of the new QoS flow may include at least one of an indication that information on the new QoS flow is not received from the user plane, and an indication that information on the new QoS flow is received from the control plane;
  when there are two or more transmission addresses for the PDU session at the radio access network side, the information related to transmission of the new QoS flow may include at least one of: an indication that the information on the new QoS flow is not received from the user plane; an indication that the information on the new QoS flow is received from the control plane; an indication that the information on the new QoS flow is received from the user plane and the information on the transmission layer address of the PDU session indicates an address on a master node; and an indication that the information on the new QoS flow is received from the user plane and the information on the transmission layer address of the PDU session indicates an address that may be used for transmitting the information on the QoS flow;
  when the transmission address of the PDU session at the radio access network side is on the secondary node, the information related to transmission of the new QoS flow may include at least one of: an indication that the information on the new QoS flow is not received from the user plane; an indication that the information on the new QoS flow is received from the control plane; and an indication that the information on the transmission layer address of the PDU session indicates the transmission layer address is on the secondary node;
  when the transmission address of the PDU session at the radio access network side is on an independent user plane node, the information related to transmission of the new QoS flow may include at least one of: an indication that the information on the new QoS flow is not received from the user plane; an indication that the information on the new QoS flow is received from the control plane; and an indication that the CP and the UP of the radio access network node are split; and an indication that the transmission address of the PDU session at the radio access network side is on an independent user plane unit;
  when the CP and the UP of the radio access network node are split, the information related to transmission of the new QoS flow may include at least one of: an indication that the information on the new QoS flow is not received from the user plane; an indication that the information on the new QoS flow is received from the control plane; and an indication that the CP and the UP of the radio access network node are split; and an indication that the transmission address of the PDU session at the radio access network side is on an independent user plane unit;

when the UE is in dual-connectivity, the information related to transmission of the new QoS flow may include at least one of: an indication that the information on the new QoS flow is not received from the user plane; an indication that the information on the new QoS flow is received from the control plane; an indication that the dual-connectivity is configured for the UE; an indication that the information on the new QoS flow is received from the user plane and the information on the transmission layer address of the PDU session indicates an address on a master node; and an indication that the information on the new QoS flow is received from the user plane and the information on the transmission layer address of the PDU session indicates an address that may be used for transmitting the information on the new QoS flow;

when the UE is in multi-connectivity, the information related to transmission of the new QoS flow may include at least one of: an indication that the information on the new QoS flow is not received from the user plane; an indication that the information on the new QoS flow is received from the control plane; an indication that the multi-connectivity is configured for the UE; an indication that the information on the new QoS flow is received from the user plane and the information on the transmission layer address of the PDU session indicates an address on a master node; and an indication that the information on the new QoS flow is received from the user plane and the information on the transmission layer address of the PDU session indicates an address that may be used for transmitting the information on the new QoS flow; and when an inquiry request on whether to expect to receive the information on the new QoS flow from the user plane is received, the information related to transmission of the new QoS flow is returned.

In some embodiments, the information related to transmission of the new QoS flow may be included in at least one message of an NG interface setup request, a PDU session resource modification indication message, a PDU session resource setup response, a PDU session resource modification request, an initial UE message, an initial UE context setup request, a UE context modification indication.

In some embodiments, in the scenario of CP/UP split, the node connected to the core network control plane is the CP, and the node where the new QoS flow arrives by means of the user plane is the UP. In order to coordinate the allocation of radio bearer resources and the like, multiple interactions between the CP and the UP may be required. In order to avoid these signaling overheads, it may be indicated that no information on the new QoS flow is expected to be received from the user plane, or that the information on the new QoS flow is expected to be received from the control plane.

Optionally, the information on the transmission layer address of the PDU session may include at least one of an indication of master address (whether the transmission layer address is a master address), an indication of secondary address (whether the transmission layer address is a secondary address), whether the transmission address is on a master node, whether the transmission address is on a secondary node, and whether the transmission address is used for transmitting the information on the QoS flow. In some embodiments, the transmission layer address indicated by the indication of master address is an address to which the information on the new QoS flow of the user plane may be transmitted. The master address may also be a transmission address on the master node.

Optionally, the information on the PDU session may be at least one of: whether the PDU session is completely offloaded to the secondary node, whether the PDU session is offloaded to the master node and the secondary node, and a type of a bearer for the PDU session (such as an MCG bearer, an MCG split bear, an SCG bearer, and/or an SCG split bearer). Transmitting the information on the new QoS flow by means of the user plane indicates directly transmitting the data of the new QoS flow to the data channel for the PDU session between the core network and the radio access network without the signaling through the control plane. After the radio access network node receives the data of the new QoS flow from the data channel for the PDU session, the information on the new QoS (e.g., an identity, 5QI, QoS parameters, and/or ARP, etc.) can be known according to the relevant header (e.g., GTP-U) of the data of the new QoS flow.

Optionally, the node for performing the method may be at least one of: a CU, a DU, a CU-CP, a CU-UP, a CU, an UP, an MN, an SN, a core network, a radio access network, a gNB, a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by a UE.

Optionally, the information related to transmission of the new QoS flow may be transmitted to at least one of: a core network, a radio access network, a gNB, a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by a UE.

FIG. 6 is a flow chart of a fifth method of operating and controlling a data flow of the present disclosure. As shown in FIG. 6, the flow includes the following steps.

At step 601, information related to transmission of the new QoS flow is acquired.

Optionally, the content of the information related to transmission of the new QoS flow is as described at step 502, which is not repeated here.

Optionally, information related to transmission of the new QoS flow is acquired from at least one of: a CU, a DU, a CU-CP, a CU-UP, a MN, an SN, a core network, a radio access network, a gNB, and a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by a UE.

At step 602, it is decided that whether and/or how to perform transmission of the information on the new QoS flow by means of a user plane according to the acquired information related to transmission of the new QoS flow.

Optionally, when the information related to transmission of the new QoS flow satisfies one of the following conditions, the new QoS flow information may be transmitted by means of the user plane:

an indication of excepting to receive information on a new QoS flow from the user plane;
only one transmission layer address of the PDU session at a radio access network side;
the CP and the UP of the radio access network are not split;
a requirement of transmitting the QoS flow through the user plane is met;
the transmission layer address of the PDU session is a master address (for example, when there are two or more transmission layer addresses for the PDU session at the radio access network side and one of them is the master address, the information on the new QoS flow may be transmitted to the master address);
the transmission layer address of the PDU session is an address on the master node (for example, when there are two or more transmission layer addresses for the PDU session at the radio access network side and one of them is an address on the master node, the information on the new QoS flow may be transmitted to the transmission address on the master node); and
the transmission layer address of the PDU session is a specified address (for example, when there are two or more transmission layer addresses for the PDU session at the radio access network side and one of them is a specified address, the information on the new QoS flow may be transmitted to the specified address).

In some embodiments, when the information related to transmission of the new QoS flow contains information on the transmission layer address of the PDU session, and when the information on the transmission layer address of the PDU session indicates that the address is an address on the master node, the information on the new QoS flow may be transmitted to the address on the master node.

In some embodiments, when the information related to transmission of the new QoS flow contains information on the transmission layer address of the PDU session, and when the information on the transmission layer address of the PDU session indicates that a certain address can be used to transmit the information on the new QoS flow, the information on the new QoS flow may be transmitted to the address that can be used to transmit the information on the new QoS flow.

In some embodiments, when the information related to transmission of the new QoS flow contains a number of transmission layer addresses for the PDU session at the radio access network side and when a number of the transmission layer addresses for the PDU session at the radio access network side is one, the information on the new QoS flow may be transmitted to the address that can be used to transmit the information on the new QoS flow.

Optionally, the information on the new QoS flow may not be transmitted by means of the user plane or the information on the new QoS flow may be added by means of the control plane signaling, when the information related to transmission of the new QoS flow satisfies one of:

there are two or more transmission layer addresses for the PDU session at a radio access network side,
there are two or more transmission layer addresses for the PDU session at a radio access network side and a master address or a secondary address is not distinguished,
there are two or more transmission layer addresses for the PDU session at a radio access network side and an address on a master node or an address on a secondary node is not distinguished,
there are two or more transmission layer addresses for the PDU session at a radio access network side and a transmission address of transmitting the information on the new QoS flow by means of the user plane is not specified,
the CP and the UP of the radio access network are split, and
a requirement of transmitting the new QoS flow through the user plane is not met.

Optionally, the node for performing the method may be at least one of the following: a CU, a DU, a CU-CP, a CU-UP, a CU, an UP, an MN, an SN, a core network, a radio access network, a gNB, and a gNB-CU, a UE, a radio access network node, a core network node, a data termination point, a UE, a non-access stratum (e.g., a NA layer) of a UE, an access stratum (e.g., an AS layer) of a UE, an application layer (e.g., an APP layer) of a UE, a core network user plane node, a core network control plane node, a source radio access network node during UE's movement, a target radio access network node during UE's movement, a new radio access network node accessed by a UE in a light connection mode or in an inactive state, an old radio access network node saving a UE context in a light connection mode or in an inactive state of the UE, a radio access network node suspending a UE, and a radio access network node to which a connection is requested to be restored by a UE.

FIG. 7 is a schematic diagram of a first embodiment of a method of operating and controlling a data flow of the present disclosure.

At step 701, the CU-UP receives data of a new QoS flow from a data channel for the PDU session between the radio access network and the core network or receives information on the new QoS flow from core network control plane signaling. The new QoS flow may refer to that a QoS flow identity contained in the header of the data packet is new and is not in the UE context saved by the CU-UP.

The CU-UP performs an operation related to the new QoS flow, which is specifically described at step 4-101, and is not repeated here.

The CU-UP may buffer the data of the new QoS flow, inform the CU-CP of the information on the new QoS flow, or request for allocation of resources. Optionally, the CU-UP can determine whether the QoS flow can be accepted.

1) If not, one of the following may be performed:
 a) not buffering the data of the new QoS flow;
 b) informing the CU-CP that the new QoS flow cannot be accepted by resources on the CU-UP;
2) If yes, one of the following may be performed:
 a) informing the CU-CP that the new QoS flow can be accepted by resources on the CU-UP.

At step 702, the CU-UP transmits the information about the new QoS flow and/or resource information on a node to the CU-CP (as described at step 301). Optionally, the resource information on the node is the resource information of the CU-UP (such as whether the PDCP resource can meet the requirement of the QoS flow), as specifically described at step 301.

The CU-CP decides whether to allocate/map the radio bearer for the new QoS flow according to the resource condition of the CU-CP and the resource condition of the DU, as described specifically at step 302.

Optionally, the CU-CP has obtained resource information of the DU from the DU or inquired the DU to acquire the resource information of the DU (the resource information of the DU is as described at step 301).

If a new radio bearer is required to be set up, it proceeds to step 7-103.

If an existing radio bearer is required to be mapped, it proceeds to step 7-203.

If the new QoS flow is refused to be accepted, it proceeds to step 7-303.

At step 7-103, the CU-CP transmits a bearer setup request to the CU-UP. Optionally, the request includes at least one of the performance result information for the new QoS flow (as described at step 302), the information on the new QoS flow, and the configuration (such as a bearer identity, and/or a configuration of the PDCP) of the radio bearer (such as DRB) to which the new QoS flow is mapped.

At step 7-104, the CU-UP transmits a bearer setup response to the CU-CP.

At step 7-105, the CU-CP transmits a radio bearer setup request to the DU. Optionally, the request includes at least one of information on the new QoS flow, a configuration of a radio bearer (such as DRB) to which the new QoS flow is mapped (such as a bearer identity, a configuration of the RLC, and/or a configuration of a logical channel).

At step 7-106, the DU transmits a bearer setup response to the CU-CP.

For step 7-103 and step 7-105, the order may be first step 7-103 and then step 7-105, or first 7-105 and then step 7-103.

At step 7-107, the CU-CP transmits an RRC message to the UE to configure the radio bearer for the UE, and the message may include at least information on the radio bearer to which the new QoS flow is mapped (such as a configuration of the PDCP, a configuration of the RLC, and/or a configuration of logical channel, etc.).

At step 7-108, after the CU-CP receives a RRC response message from the UE to confirm that the UE configuration is successful, optionally, the CU-CP transmits a bearer setup completion message to the CU-UP. According to the bearer setup completion message, the CU-UP can transmit the data of the new QoS flow to the mapped bearer.

At step 7-203, the CU-CP decides that the new QoS flow is mapped to the existing radio bearer and transmits a bearer modification request to the CU-UP. Optionally, the request includes at least one of performance result information for the new QoS flow (as described in step 302), information about the new QoS flow, and information on a radio bearer to which the new QoS flow is mapped.

At step 7-204, the CU-UP returns a bearer modification response to the CU-CP.

At step 7-205, optionally, the CU-CP transmits a RRC message to the UE to update, for the UE, the QoS flow mapped to the radio bearer, and the message may include at least: information on the radio bearer to which the new QoS flow is mapped. In other embodiments, the UE receives the new QoS flow from the existing radio bearer, and then sets up a mapping relationship between the new QoS flow and the radio bearer, without using the RRC message to synchronize the mapping between the radio bearer and the QoS flow.

At step 7-206, after the CU-CP receives a RRC response message from the UE, optionally, the CU-CP transmits a bearer modification completion message to the CU-UP. According to the bearer modification completion message, the CU-UP can transmit the data of the new QoS flow to the mapped bearer.

At step 7-303, when the CU-CP decides to refuse the new QoS flow, a message of refusal to accept the new QoS flow is transmitted to the CU-UP. Optionally, the message contains at least the performance result information for the new QoS flow (as described at step 302).

After the CU-UP receives it, the buffered data of the new QoS flow may be deleted, as described at step 4-103.

At Step 7-304, the CU-CP may also transmit a notification of refusing QoS flow to the core network control plane node (such as an AMF and an SMG) to notify the core network that the radio access network cannot meet the requirement of the new QoS flow and cannot allocate/map the radio bearer.

It can be seen from the above embodiment that the CU-UP indicates the information on the new QoS flow and/or the resource information of the CU-UP (such as whether the new QoS flow can be accepted) to the CU-CP, and the CU-CP decides to allocate/map radio bearer resources for the new QoS flow in conjunction with the resource condition of the CU-UP and the resource condition of the DU.

FIG. 8 is a schematic diagram of a second embodiment of a method of operating and controlling a data flow of the present disclosure.

At step 801, a CU-UP receives data of a new QoS flow from a data channel for a PDU session between the radio access network and the core network or receives information on a new QoS flow from the core network control plane signaling. The new QoS flow may refer to that a QoS flow identity contained in the header of the data packet is new and is not in the UE context saved by the CU-UP.

The CU-UP may allocate/map a radio bearer resource for the new QoS flow. Optionally, the CU-UP may obtain the resource information of the DU accessed by the UE through the CU-CP. The CU-UP may decide whether to allocate/map the radio bearer resource in according to its own resource information and/or resource information of the DU, as described at step 302.

If a new radio bearer is required to be set up, it proceeds to step 8-102.

If an existing radio bearer is required to be mapped, it proceeds to step 8-202.

If the new QoS flow is refused to be accepted, it proceeds to step 8-302.

At step 8-102, the CU-UP transmits a bearer setup request to the CU-CP. Optionally, the request contains at least one of performance result information for the new QoS flow (as described at step 302), information for the new QoS flow, a configuration of the bearer to which the new QoS flow is mapped (such as an identity of the bearer, and/or a configuration of the PDCP).

At step 8-103, the CU-CP transmits a radio bearer setup request to the DU. Optionally, the request contains at least one of information for the new QoS flow, a configuration of the radio bearer (such as DRB) to which the new QoS flow is mapped (such as an identity of the bearer, a configuration of the RLC, and/or a configuration of the logical channel).

At step 8-104, the DU transmits a bearer setup response to the CU-CP.

At step 8-105, the CU-CP transmits an RRC message to the UE to configure a radio bear for the UE, and the message may include at least information on the radio bearer to which the new QoS flow is mapped (such as a configuration of the PDCP, a configuration of the RLC, and/or a configuration of the logical channel, etc.).

At step 8-106, after the CU-CP receives a RRC response message from the UE to confirm that the UE is successfully configured, the CU-CP transmits a bearer setup response or a bearer setup completion to the CU-UP. Optionally, the CU-CP may return the bearer setup response to the CU-UP after step 8-104, and may return the bearer setup completion at step 8-106. According to the received bearer setup response/bearer setup completion, the CU-UP can transmit the data of the new QoS flow to the mapped bearer.

At step 8-202, the CU-UP decides that new QoS flow is mapped to an existing radio bearer and transmits a bearer modification request to the CU-CP. Optionally, the request contains at least one of performance result information for the new QoS flow (as described in step 302), information for the new QoS flow, and information for a radio bearer to which the new QoS flow is mapped.

At step 8-203, optionally, the CU-CP transmits a RRC message to the UE to update, for the UE, the new QoS flow mapped to the radio bearer, the message may include at least: the information on the radio bearer to which the new QoS flow is mapped. In other embodiments, when the UE receives the new QoS flow from the existing radio bearer, the mapping relationship between the radio bearer and the new QoS flow is set up, and thus there may be no need to use the RRC message to synchronize the mapping between the radio bearer and the QoS flow.

At step 8-204, after the CU-CP receives a RRC response message from the UE, optionally, the CU-CP transmits a bearer modification response/bear modification completion to the CU-UP. According to the bearer modification response/bear modification completion, the CU-UP can transmit the data of the new QoS flow to the mapped radio bearer.

At step 8-302, when the CU-UP decides to refuse the new QoS flow, a message related to refusal to accept the new QoS flow is transmitted to the CU-CP. Optionally, the message contains at least performance result information for the new QoS flow (as described in step 302).

At step 8-303, after the CU-CP receives a message related to refusal to accept the new QoS flow from the CU-UP, the CU-CP may transmit notification of refusing QoS flow to the core network control plane node (such as an AMF and an SMG) to notify the core network that the radio access network cannot meet the requirement of the new QoS flow, and cannot allocate/map the radio bearer.

As can be seen from the above embodiment, the CU-UP decides to allocate/map the radio bearer resource for the new QoS flow in conjunction with the resource of the CU-UP and the resource condition of the DU.

FIG. 9 is a schematic diagram of a third embodiment of a method of operating and controlling a data flow of the present disclosure.

At step 901, the secondary node receives data of a new QoS flow from a data channel for the PDU session between the radio access network and the core network or receives information on the new QoS flow from the core network control plane signaling. The new QoS flow may refer to that a QoS flow identity contained in the header of the data packet is new and is not in the UE context saved by the CU-UP.

The secondary node performs an operation related to the new QoS flow, which is described in detail at step 4-101, and will not be repeated here.

The secondary node can buffer the data of the new QoS flow, inform the master node of the information on the new QoS flow, or request for allocation of resources. Optionally, the secondary node may determine whether the QoS flow can be accepted.

1) If not, one of the following may be performed:
a) not buffering the data of the new QoS flow;
b) informing the master node that the new QoS flow cannot be accepted by the resource on the secondary node;
2) If yes, one of the following may be performed:
a) informing the master node that the new QoS flow can be accepted by the resource on the secondary node.

At step 902, the secondary node transmits the information on the new QoS flow and/or the resource information on the node to the master node (as described at step 301). Optionally, the resource information on the node is resource information on the secondary node (such as whether the resource of the PDCP can meet the requirement of the QoS flow), as specifically described at step 301.

The master node makes, in conjunction with the resource of the master node and the resource condition of the secondary node, at least one of the following decisions:
whether the secondary node is required to allocate/map radio bearer resources for the new QoS flow;
whether to transfer the new QoS flow back to the master node; and
Whether to allocate/map a radio bearer for new QoS flow.

If a new radio bearer is required to be set up, it proceeds to step 9-103;
If an existing radio bearer is required to be mapped, it proceeds to step 9-203;
If the secondary node is required to decide to allocate/map the radio bearer resource (such as an SCG bearer, an SCG split bearer) for the new QoS flow, it proceeds to step 9-303;
If the new QoS is required to be transferred back to the master node (such as an MCG bearer, an MCG separate bearer), it proceeds to step 9-403; and
If the new QoS flow is refused to be accepted, it proceeds to step 9-503.

At step 9-103, the master node transmits a bearer setup request to the secondary node. Optionally, the request contains at least one of performance result information for the new QoS flow (as described at step 302), information on the new QoS flow, and a configuration of the radio bearer (such as a DRB) to which the new QoS flow is mapped (such as an identity of the bearer, and/or a configuration of the PDCP).

At step 9-104, the secondary node transmits a bearer setup response to the master node.

At step 9-105, the master node transmits a RRC message to the UE to configure the radio bearer for the UE, the message may include at least information on the radio bearer to which the new QoS flow is mapped (such as a configuration of the PDCP, a configuration of the RLC, and/or a configuration of the logical channel, etc.).

At step 9-106, after the master node receives the RRC response message from the UE to confirm that the UE is successfully configured, optionally the master node transmits a bearer setup completion message to the secondary node. According to the bearer setup completion message, the secondary node may transmit data of the new QoS flow to the mapped bearer.

At step 9-203, the master node decides that the new QoS flow is mapped to the existing radio bearer, and transmits a bearer modification request to the secondary node. Optionally, the request contains at least one of performance result information for the new QoS flow (as described at step 302), information on the new QoS flow, and information on the radio bearer to which the new QoS flow is mapped.

At step 9-204, the secondary node returns a bearer modification response to the master node.

At step 9-205, optionally, the master node transmits a RRC message to the UE to update, for the UE, the QoS flow mapped to the radio bearer, and the message may include at least the information on the radio bearer to which the new QoS flow is mapped. In other embodiments, the UE receives the new QoS flow from the existing radio bearer, and then sets up a mapping relationship between the new QoS flow and the radio bearer, thus there may be no need to use the RRC message to synchronize the mapping between the radio bearer and the QoS flow.

At step 9-206, after receiving the RRC response message from the UE, optionally, the master node may transmit a bearer modification completion message to the secondary node. According to the bearer modification completion message, the secondary node may transmit data of the new QoS flow to the mapped bearer.

At step 9-303, the master node requests the secondary node to allocate/map the radio bearer resource for the new QoS flow. Optionally, the request contains at least one of the performance result information for the new QoS flow (as described at step 302).

At step 9-304, after the secondary node makes a decision, a bearer setup request or a bearer modification request is transmitted to the master node.

At step 9-305, the master node transmits an RRC message to the UE, so as to configure, for the UE, a radio bearer to which the new QoS flow is mapped or update the QoS flow mapped to the radio bearer.

At step 9-306, after the master node receives the RRC response message from the UE, the master node may optionally transmit the bearer setup completion or bearer modification completion message to the secondary node. According to the bearer setup completion or bearer modification completion message, the secondary node may transmit the data of the new QoS flow to the mapped bearer.

At step 9-403, the master node decides to transfer the new QoS flow to the master node and transmits a data forwarding request to the secondary node. Optionally, the request contains at least one of performance result information for the new QoS flow (as described at step 302) and a data forwarding address (which may be at a QoS flow level or at a PDU session level). Once receiving it, the secondary node forwards the data of the new QoS flow.

At step 9-404, the master node transmits a RRC message to the UE so as to configure, for the UE, a radio bearer to which the new QoS flow is mapped or update the QoS flow mapped to the radio bearer.

At step 9-405, the master node updates a transmission address of the new QoS flow at the radio access network side to the core network. The transmission address is a transmission address on the master node. After the core network control plane node receives the transmission address, the core network control plane node transmits it to the core network user plane node for update. Subsequently the data of the new QoS flow is transmitted to the master node.

At step 9-503, when deciding to refuse the new QoS flow, the master node transmits to the secondary node a message related to refusal to accept the new QoS flow. Optionally, the message contains at least performance result information for the new QoS flow (as described at step 302).

Once the secondary node receives it, the buffered data of the new QoS flow may be deleted.

At step 9-504, the master node may also transmit a notification of refusing QoS flow to the core network control plane node (such as an AMF, an SMG) to notify the core network that the radio access network cannot meet the requirement of the new QoS flow, and cannot allocate/map the radio bearer.

It can be seen from the above embodiments that the secondary node indicates to the master node information on the new QoS flow and/or resource information on the secondary node (such as whether the new QoS flow can be accepted), and the master node decides to allocate/map the radio bearer resource for the new QoS flow and/or decide whether data forwarding is required, in conjunction with the resource conditions of the master node and the secondary node and/or a type of the bearer (e.g., an MCG bearer, an MCG split bearer, an SCG bearer, an SCG split bearer, etc.).

FIG. 10 is a schematic diagram of a fourth embodiment of a method of operating and controlling a data flow of the present disclosure.

At step 1001, the secondary node receives data of the new QoS flow from a data channel for the PDU session between the radio access network and the core network or receives information on the new QoS flow from the core network control plane signaling. The new QoS flow may refer to that a QoS flow identity contained in the header of the data packet contains is new and is not in the UE context saved by the secondary node.

The secondary node can allocate/map the radio bearer resource for the new QoS flow. The secondary node may decide whether to allocate/map the radio bearer resource in conjunction with its own resource situation and/or the type of UE bearer (e.g., an SCG bearer, an SCG split bearer).

If a new radio bearer is required to be set up, it proceeds to step 10-102.

If an existing radio bearer is required to be mapped, it proceeds to step 10-202.

If the new QoS flow is refused to be accepted, it proceeds to step 10-302.

At step 10-102, the secondary node transmits a bearer setup request to the master node. Optionally, the request contains at least one of performance result information for the new QoS flow (as described at step 302), information on the new QoS flow, and a configuration of the bearer to which the new QoS flow is mapped.

At step 10-103, the master node transmits an RRC message to the UE to configure the radio bearer for the UE, and the message may include at least information on the radio bearer to which the new QoS flow is mapped (such as a configuration of the PDCP, a configuration of the RLC, and/or a configuration of the logical channel, etc.).

At step 10-104, after the master node receives a RRC response message from the UE to confirm that the UE is successfully configured, the master node transmits a bearer setup response or a bearer setup completion to the secondary node. Optionally, the master node may return the bearer setup response to the secondary node after step 10-102, and may return the bearer setup completion at step 10-103. According to the bearer setup response/bearer setup completion, the secondary node may transmit the data of the new QoS flow to the mapped bearer.

At step 10-202, the secondary node decides that the new QoS flow is mapped to the existing radio bearer, and transmits a bearer modification request to the master node. Optionally, the request contains at least one of performance result information for the new QoS flow (as described at step 302), information on the new QoS flow, and information on the radio bearer to which the new QoS flow is mapped.

At step 10-203, optionally, the master node transmits a RRC message to the UE to update, for the UE, the QoS flow mapped to the radio bearer, and the message, may include at least information on the radio bearer to which the new QoS flow is mapped. In other embodiments, the UE receives the new QoS flow from the existing radio bearer, and then sets up a mapping relationship between the new QoS flow and the radio bearer, thus there may be no need to use the RRC message to synchronize the mapping between the radio bearer and the QoS flow.

At step 10-204, after receiving the RRC response message from the UE, the master node may optionally transmit the bearer modification response/bearing modification completion to the secondary node. According to the bearer modification response/bearer modification completion, the secondary node can transmit data of the new QoS flow to the mapped bearer.

At step 10-302, when the secondary node decides to refuse the new QoS flow, the secondary node transmits a message related to refusal to accept the new QoS flow to the master node. Optionally, the message contains at least performance result information for the new QoS flow (as described at step 302).

At step 10-303, After receiving it, the secondary node may transmit a notification of refusing QoS flow to the core network control plane node (such as an AMF and an SMG) to notify the core network that the radio access network cannot meet the requirement of the new QoS flow, and cannot allocate/map the radio bearer.

As can be seen from the above embodiments, the secondary node decides to allocate/map the radio bearer resource for the new QoS flow and/or to decide whether data forwarding is required, in conjunction with the resources of the secondary node and/or a type of the bearer (e.g., an SCG bearer, an SCG split bearer).

FIG. 11 is a schematic diagram of a fifth embodiment of a method of operating and controlling a data flow of the present disclosure. The CP-UP may obtain a resource of the DU in two ways, respectively as shown at steps 11-101 to 11-105 and at steps 11-201 to 11-207.

At step 11-101, the DU transmits the resource condition report of the DU to the CU-CP. Optionally, the report contains at least resource information of the DU (as described at step 301, such as an identity of the DU, an identity of the cell managed by the DU, a resource condition of the DU, and a resource condition of the cell).

At step 11-102, the CU-CP transmits the received resource condition report of the DU to the CU-UP. Optionally, the report contains at least one of the resource information of the DU (as described at step 301). Since a number of the CU-UP to which the CU-CP is connected may be multiple, a number of the DU to which the CU-CP is connected may also be multiple. The CU-CP may only transmit the resource condition report of the DU that supports the CU-UP's management area (e.g., a TA) to the CU-UP.

At step 11-103, the UE initially accesses, for example, initiates a RRC connection setup request or a RRC connection restoration request.

At step 11-104, the CU-CP selects the DU for serving the UE (such as the DU accessed by the UE), and sets up the context of the UE.

At step 11-105, the CU-CP selects the CU-UP serving the UE and sets up the context of the UE. Optionally, the context setup request of the UE contains at least one of an identity of the DU serving the UE, and an identity of the cell serving the UE. The resource information of the DU may be associated through the identity of the DU. Through the identity of the cell, the resource condition of the cell or the resource information of the DU managing the cell may be associated. By obtaining the resource information of the CU-UP and/or the resource information of the DU, it can be determined whether the radio bearer resource can be allocated or mapped for the QoS flow of the UE.

At step 11-201, the UE initially accesses, for example, initiates a RRC connection setup request or a RRC connection restoration request.

At step 11-202, the CU-CP selects the DU serving the UE and sets up the context of the UE.

At step 11-203, the CU-CP selects the CU-UP serving the UE and sets up the context of the UE. Optionally, the context setup request of the UE contains at least one of information of the DU serving the UE (an identity of the DU, and/or a transmission address, etc.), an identity of the cell serving the UE.

At step 11-204, the CP-UP transmits a resource condition request to the CU-CP to request for obtaining resource information of the DU. Optionally, the request contains at least one of: information of the DU serving the UE (an identity of the DU, and/or a transmission address, etc.), an identity of the cell serving the UE, information of the CU-CP serving the UE (an identity of the CU-CP, and/or a transmission address of the CU-CP, etc.), and information of the CU-UP serving the UE (an identity of the CU-UP, and/or a transmission address of the CU-UP, etc.).

At step 11-205, the CU-CP transmits a resource condition request to the DU to request for obtaining resource information of the DU. Optionally, the request contains at least one of: information of the DU serving the UE (an identity of the DU, and/or a transmission address, etc.), an identity of the cell serving the UE, information of the CU-CP serving the UE (an identity of the CU-CP, and/or a transmission address of the CU-CP, etc.), and information of the CU-UP serving the UE (an identity of the CU-UP, and/or a transmission address of the CU-UP, etc.).

At step 11-206, the DU transmits a resource condition report to the CU-CP. Optionally, the report contains at least one of: resource information of the DU, information of the CU-CP serving the UE (an identity of the CU-CP, and/or a transmission address of the CU-CP, etc.), and information of the CU-UP serving the UE (an identity of the CU-UP, and/or a transmission address of the CU-UP, etc.).

At step 11-207, the CU-CP transmits a resource condition report of the DU to the CU-UP. Optionally, the report contains at least one of: resource information of the DU, information of the CU-UP serving the UE (an identity of the CU-UP, and/or a transmission address of the CU-UP, etc.).

As can be seen from the above embodiments, the CP-UP can be associated with the current resource condition of the DU for the UE, through the information on the cell or DU accessed by the UE.

FIG. 12 is a schematic diagram of a sixth embodiment of a method of operating and controlling a data flow of the present disclosure. The CU-CP may obtain resource information on the CP-UP from the CP-UP (as described at step 301), as shown at step 12-101; the CU-CP may obtain resource information of the DU from the DU (as described at step 301), as shown at step 12-201.

At step 12-101, the DU transmits a resource condition report of the DU to the CU-CP. The DU may transmit the resource condition report after receiving the resource condition request from the CU-CP.

At step 12-201, the CU-UP transmits a resource condition report of the CU-UP to the CU-CP. The CU-UP may transmit the resource condition report after receiving the resource condition request from the CU-CP.

Steps 12-101 and 12-201 are independent processes.

As can be seen from the above embodiment, the CU-CP can obtain the resource information of the CU-UP and the DU, and can decide whether the resource meets the requirement of the new QoS flow.

FIG. 13 is a structure diagram of a preferred device of the present disclosure. Referring to FIG. 13, the present disclosure proposes an apparatus for operating and controlling a data flow including: an acquisition module for acquiring information on a Quality-of-Service (QoS) flow and/or resource information on a node; and a decision module for deciding performance result information for the QoS flow according to the acquired resource information on the node and/or the acquired information on the QoS flow.

FIG. 14 is a structure diagram of a preferred device of the present disclosure. Referring to FIG. 14, the present disclosure proposes an apparatus for operating and controlling a data flow including: a detection module for detecting a Quality-of-Service (QoS) flow; a receiving module for receiving performance result information for the QoS flow; and a performing module for performing an operation related to the QoS flow by performing the operation according to the performance result information for the QoS flow.

FIG. 15 is a structure diagram of a preferred device of the present disclosure. Referring to FIG. 15, the present disclosure proposes an apparatus for operating and controlling a data flow including: a determination module for determining whether to satisfy a predetermined condition; and a decision module for deciding information related to transmission of a Quality-of-Service (QoS) flow when it is determined that the predetermined condition is satisfied.

FIG. 16 is a structure diagram of a preferred device of the present disclosure. Referring to FIG. 16, the present disclosure proposes an apparatus for operating and controlling a data flow including: an acquisition module for acquiring information related to transmission of a Quality-of-Service (QoS) flow; and a decision module for deciding whether and/or how to transmit the information on the QoS flow by means of a user plane, according to the acquired information related to transmission of the QoS flow.

FIG. 17 is a structure diagram of a preferred device 1700 of the present disclosure. Referring to the FIG. 17, the device 1700 may include a processor 1710, a transceiver 1720 and a memory 1730. However, all of the illustrated components are not essential. The device 1700 may be implemented by more or less components than those illustrated in FIG. 17. In addition, the processor 1710 and the transceiver 1720 and the memory 1730 may be implemented as a single chip according to another embodiment.

The aforementioned components will now be described in detail.

The processor 1710 may include one or more processors or other processing devices that control the proposed function, process, and/or method. Operation of the device 1700 may be implemented by the processor 1710.

The processor 1710 may detect a PDCCH on a configured control resource set. The processor 1710 determine a method for dividing CBs and a method for rate matching of a PDSCH according to the PDCCH. The processor 1710 may control the transceiver to receive the PDSCH according to the PDCCH. The processor 1710 may generate HARQ-ACK information according to the PDSCH. The processor 1710 may control the transceiver to transmit the HARQ-ACK information.

The processor 1710 may acquire information on a Quality-of-Service (QoS) flow and/or resource information on a node, and decide performance result information for the QoS flow according to the acquired resource information on the node and/or the acquired information on the QoS flow. The processor 1710 may detect a Quality-of-Service (QoS) flow, receive performance result information for the QoS flow, and perform an operation related to the QoS flow by performing the operation according to the performance result information for the QoS flow. The processor 1710 may determine whether to satisfy a predetermined condition, and decide information related to transmission of a Quality-of-Service (QoS) flow when it is determined that the predetermined condition is satisfied. The processor 1710 may acquire information related to transmission of a Quality-of-Service (QoS) flow, and decide whether and/or how to transmit the information on the QoS flow by means of a user plane, according to the acquired information related to transmission of the QoS flow.

The transceiver 1720 may include a RF transmitter for up-converting and amplifying a transmitted signal, and a RF receiver for down-converting a frequency of a received signal. However, according to another embodiment, the transceiver 1720 may be implemented by more or less components than those illustrated in components.

The transceiver 1720 may be connected to the processor 1710 and transmit and/or receive a signal. The signal may include control information and data. In addition, the transceiver 1720 may receive the signal through a wireless channel and output the signal to the processor 1710. The transceiver 1720 may transmit a signal output from the processor 1710 through the wireless channel.

The memory 1730 may store the control information or the data included in a signal obtained by the device 1700. The memory 1730 may be connected to the processor 1710 and store at least one instruction or a protocol or a parameter for the proposed function, process, and/or method. The memory 1730 may include read-only memory (ROM) and/or random access memory (RAM) and/or hard disk and/or CD-ROM and/or DVD and/or other storage devices.

The above merely describes preferred embodiments of the present disclosure and explains the applied technical principles. Those skilled in the art should understand that the inventive scope involved in the present disclosure is not limited to the technical solution formed by a specific combination of the above technical features, but also should cover other technical solutions formed by any combination of the above technical features or other equivalents without departing from the inventive concept. For example, the above features and the technical features disclosed in the present disclosure (without limitation) having similar functions are replaced by each other to form the technical solutions.

The above merely describes preferred embodiments of the present disclosure and is not intended to limit the present disclosure. Any modification, equivalent substitution and improvement made within the spirit and principle of the present disclosure shall be included within the scope of protection of the present disclosure.

The invention claimed is:

1. A method of controlling data flow by a centralized unit-control plane (CU-CP) of a gNodeB, the method comprising:
    determining a mapping of a quality of service (QoS) flow to a data radio bearer (DRB);
    transmitting, to a centralized unit-user plane (CU-UP) connected to the CU-CP through an E1 interface, a bearer context configuration message including information of the determined mapping of the QoS flow to the DRB; and
    receiving, from the CU-UP through the E1 interface, a response to the bearer context configuration message,
    wherein the information of the determined mapping of the QoS flow to the DRB includes service data adaptation protocol (SDAP) configuration information of the DRB and packet data convergence protocol (PDCP) configuration information of the DRB.

2. The method of claim 1, wherein the bearer context configuration message includes at least one of a bearer context setup request message or a bearer context modification request message.

3. The method of claim 1, wherein the information of the determined mapping of the QoS flow to the DRB includes an identity of the DRB.

4. The method of claim 1,
    wherein the information of the determined mapping of the QoS flow to the DRB includes information of the QoS flow, and
    wherein the information of the QoS flow includes an identity of the QoS flow.

5. The method of claim 1, further comprising:
    receiving, from the CU-UP through the E1 interface, information indicating a release of the QoS flow; and
    transmitting, to a core network, information notifying that the QoS flow is to be released.

6. A method of controlling data flow by a centralized unit-user plane (CU-UP) of a gNodeB, the method comprising:
    receiving, from a centralized unit-control plane (CU-CP) of the gNodeB connected to the CU-UP through an E1 interface, a bearer context configuration message including information of a mapping of a quality of service (QoS) flow to a data radio bearer (DRB); and
    transmitting, to the CU-CP through the E1 interface, a response to the bearer context configuration message,
    wherein the mapping of the QoS flow to the DRB is determined at the CU-CP, and
    wherein the information of the determined mapping of the QoS flow to the DRB includes service data adaptation protocol (SDAP) configuration information of the DRB and packet data convergence protocol (PDCP) configuration information of the DRB.

7. The method of claim 6, wherein the bearer context configuration message includes at least one of a bearer context setup request message or a bearer context modification request message.

8. The method of claim 6, wherein the information of the determined mapping of the QoS flow to the DRB includes an identity of the DRB and information of the QoS flow including an identity of the QoS flow.

9. The method of claim 6, further comprising:
    transmitting, to the CU-CP through the E1 interface, information indicating a release of the QoS flow.

10. A centralized unit-control plane (CU-CP) of a gNodeB for controlling data flow, the CU-CP comprising:
    a transceiver; and
    at least one controller coupled with the transceiver and configured to:
        determine a mapping of a quality of service (QoS) flow to a data radio bearer (DRB),
        transmit, to a centralized unit-user plane (CU-UP) connected to the CU-CP through an E1 interface, a bearer context configuration message including information of the determined mapping of the QoS flow to the DRB, and
        receive, from the CU-UP through the E1 interface, a response to the bearer context configuration message from the CU-CP,
    wherein the information of the determined mapping of the QoS flow to the DRB includes service data adaptation protocol (SDAP) configuration information of the DRB and packet data convergence protocol (PDCP) configuration information of the DRB.

11. The CU-CP of claim 10, wherein the bearer context configuration message includes at least one of a bearer context setup request message or a bearer context modification request message.

12. The CU-CP of claim 10, wherein the information of the determined mapping of the QoS flow to the DRB includes an identity of the DRB.

13. The CU-CP of claim 10,
    wherein the information of the determined mapping of the QoS flow to the DRB includes information of the QoS flow, and
    wherein the information of the QoS flow includes an identity of the QoS flow.

14. The CU-CP of claim 10, wherein the at least one controller is further configured to:
    receive, from the CU-UP through the E1 interface, information indicating a release of the QoS flow; and
    transmit, to a core network, information notifying that the QoS flow is to be released.

15. A centralized unit-user Plane (CU-UP) of a gNodeB for controlling data flow, the CU-UP comprising:
    a transceiver;
    at least one memory storing instructions; and
    at least one processor configured to execute the stored instructions to:
        receive, from a centralized unit-control plane (CU-CP) connected to the CU-UP through an E1 interface, a bearer context configuration message including information of a mapping of a quality of service (QoS) flow to a data radio bearer (DRB), and
        transmit, to the CU-CP through the E1 interface, a response to the bearer context configuration message,
    wherein the mapping of the QoS flow to the DRB is determined at the CU-CP, and
    wherein the information of the determined mapping of the QoS flow to the DRB includes service data adaptation protocol (SDAP) configuration information of the DRB and packet data convergence protocol (PDCP) configuration information of the DRB.

16. The CU-UP of claim 15, wherein the bearer context configuration message includes at least one of a bearer context setup request message or a bearer context modification request message.

17. The CU-UP of claim 16, wherein the information of the determined mapping of the QoS flow to the DRB includes an identity of the DRB and information of the QoS flow including an identity of the QoS flow.

18. The CU-UP of claim 15, wherein the at least one processor is further configured to:
 transmit, to the CU-CP through the E1 interface, information indicating a release of the QoS flow.

19. A non-transitory computer-readable recording medium on which a program for executing the method of claim 1 is recorded.

* * * * *